US012714895B2

(12) United States Patent
Diaz

(10) Patent No.: US 12,714,895 B2
(45) Date of Patent: Aug. 25, 2026

(54) FLAME ARRESTERS AND END HOUSINGS FOR FLAME ARRESTERS

(71) Applicant: Emerson Process Management Regulator Technologies, Inc., McKinney, TX (US)

(72) Inventor: Juan Manuel Diaz, Melissa, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 335 days.

(21) Appl. No.: 18/071,262

(22) Filed: Nov. 29, 2022

(65) Prior Publication Data

US 2024/0173583 A1 May 30, 2024

(51) Int. Cl.
*A62C 4/02* (2006.01)

(52) U.S. Cl.
CPC .................................... *A62C 4/02* (2013.01)

(58) Field of Classification Search
CPC .................................... A62C 4/02; A62C 4/00
See application file for complete search history.

(56) References Cited

U.S. PATENT DOCUMENTS 5,145,360 A * 9/1992 Rajewski .................. F23G 5/50 222/189.01
5,415,233 A 5/1995 Roussakis et al.
6,342,082 B1 1/2002 Leinemann
6,409,779 B2 6/2002 Leinemann
7,918,664 B2 4/2011 Leinemann
2003/0022116 A1* 1/2003 Brooker .................. F23D 14/82 431/2

(Continued)

FOREIGN PATENT DOCUMENTS

CN 109937327 A 6/2019
CN 211986747 U 11/2020
CN 115282532 A 11/2022

(Continued)

OTHER PUBLICATIONS

Canadian Intellectual Property Office, "Examiner Requisition," issued in connection with Canadian Patent Application No. 3,221,140, dated Jul. 21, 2025, 6 pages.

(Continued)

*Primary Examiner* — Qingzhang Zhou
(74) *Attorney, Agent, or Firm* — Hanley, Flight & Zimmerman, LLC

(57) ABSTRACT

Flame arresters and end housings for flame arresters are described herein. An example flame arrester includes an end housing. The end housing includes a pipe section having a first end and a second end opposite the first end, the pipe section having a first inner diameter along a first length between the first end and the second end. The end housing also includes a connection flange extending from the pipe section at the first end and a body flange extending from the pipe section at the second end. The flame arrester also includes a body having a third inner diameter along a second length, the third inner diameter being larger than the first inner diameter. The flame arrester also includes a flame cell disposed in the body, the flame cell having a first side, a second side, and a plurality of channels between the first and second sides.

12 Claims, 17 Drawing Sheets

(56) References Cited

U.S. PATENT DOCUMENTS

| | | | | |
|---|---|---|---|---|
| 2016/0346575 | A1 | | 12/2016 | Hong et al. |

FOREIGN PATENT DOCUMENTS

| | | | | | |
|---|---|---|---|---|---|
| CN | 217828671 | U | | 11/2022 | |
| GB | 2522476 | A | * | 7/2015 | ............... A62C 4/02 |
| KR | 20190100165 | A | * | 8/2019 | ............. F23D 14/82 |
| KR | 20210065652 | A | | 6/2021 | |
| RU | 2646732 | C2 | | 3/2018 | |
| WO | WO-9400197 | A1 | * | 1/1994 | ............... A62C 4/02 |
| WO | WO-0056406 | A1 | * | 9/2000 | ............... A62C 4/02 |
| WO | 2004020902 | A1 | | 3/2004 | |

OTHER PUBLICATIONS

Elmac Technologies, "In-Line Detonation Flame Arresters With HEDS® Technology Explained," YouTube, Aug. 18, 2022, retrieved from <https://www.youtube.com/watch?v=MPr2V_hUrTA> on Apr. 9, 2026, 3 pages.

China National Intellectual Property Administration, "First Office Action and First Search," issued in connection with Chinese Patent Application No. 202311602335.6, dated Apr. 13, 2026, 26 pages. [English machine translation included.].

* cited by examiner

FLAME ARRESTERS AND END HOUSINGS FOR FLAME ARRESTERS

FIELD OF THE DISCLOSURE

This disclosure relates to flame arresters and end housings for flame arresters.

BACKGROUND

Piping systems and storage systems are commonly used to transmit and store combustible fluids (e.g., natural gas, fuel, mixtures, etc.). These systems commonly utilize flame arresters to prevent or inhibit the propagation of a flame or combustion from one side of the flame arrester to the other side of the flame arrester. For example, if a fire or explosion occurs downstream, the flame arrester prevents or inhibits the flame from propagating upstream before it reaches a large fuel source. An end-of-line flame arrester is a type of flame arrester that is situated within a passage, such as a vent or drain port. An in-line flame arrester is a type of flame arrester that is installed in a pipe or between two pipes to prevent flames from passing therethrough.

In general, a flame arrester typically includes a flame cell having a plurality of small channels that allow fluid to flow freely through the flame arrester. The fluid flows through the flame arrester in a first direction during normal operation of the piping system. However, if combustion occurs downstream of the flame arrester, the flame cell prevents a flame from propagating upstream across the flame arrester. This prevents or reduces the likelihood of a fire traveling from one area (e.g., a downstream area, a power sink, unprotected side, etc.) to another area (e.g., an upstream area, a supply tank, protected side, etc.).

SUMMARY

An example flame arrester disclosed herein includes a first end housing, a second end housing, a body, and a flame cell. The first end housing includes a first pipe section having a first end and a second end opposite the first end. The first pipe section has a first inner diameter along a first length between the first end and the second end. The first end housing also includes a first connection flange extending from the first pipe section at the first end. The first end housing also includes a first body flange extending from the first pipe section at the second end. The second end housing includes a second pipe section having a third end and a fourth end opposite the third end. The second pipe section has a second inner diameter along a second length between the third end and the fourth end. The second end housing includes a second connection flange extending from the second pipe section at the third end. The second end housing also includes a second body flange extending from the second pipe section at the fourth end. The body is coupled between the first body flange and the second body flange. The body has a third inner diameter along a third length between the first and second body flanges. The third inner diameter of the body is larger than the first and second inner diameters. The flame cell is disposed in the body. The flame cell has a first side and a second side. The flame cell also has a plurality of channels between the first side and the second side.

An example end housing of a flame arrester disclosed herein includes a pipe section, a first flange, a second flange, and a body portion. The pipe section has a first end and a second end opposite the first end. The pipe section also has a first inner diameter along a first length extending between the first and second end. The first flange extends radially outward from the first end of the pipe section and has a first outer diameter. The second flange extends radially outward from the second end of the pipe section. The second flange also has a second outer diameter that is larger than the first outer diameter. The body portion extends axially from the second flange in a direction away from the pipe section. The body portion has a third end coupled to the second flange and a fourth end opposite the third end. The body portion also has a second inner diameter and a third outer diameter along a second length that extends between the third and fourth ends. The second inner diameter is larger than the first inner diameter, and the third outer diameter is larger than the first outer diameter.

An example flame arrester disclosed herein includes a pair of end housings, a body, and a disk-shaped flame cell. Each end housing of the pair of end housings includes a connection flange, a body flange, and a pipe section. The connection flange has a first inner diameter and a first outer diameter. The body flange has a second inner diameter and a second outer diameter. The pipe section extends along a first length between a first end and a second end opposite the first end. The first end is coupled to the connection flange, and the second end is coupled to the body flange. The pipe section also has the first inner diameter and a third outer diameter. The third outer diameter corresponds to the second inner diameter, and the first inner diameter of the pipe section is constant along the first length. The body is between the pair of end housings and has a third end and a fourth end opposite the third end. The body also has a third inner diameter along a second length between the third and fourth ends. The third inner diameter is constant along the second length. The disk-shaped flame cell is disposed in the body. The disk-shaped flame cell has a first side, a second side, and a plurality of channels between the first and second sides.

BRIEF DESCRIPTION OF THE DRAWINGS

The figures are not to scale. In general, the same reference numbers will be used throughout the drawing(s) and accompanying written description to refer to the same or like parts.

Figure 1:
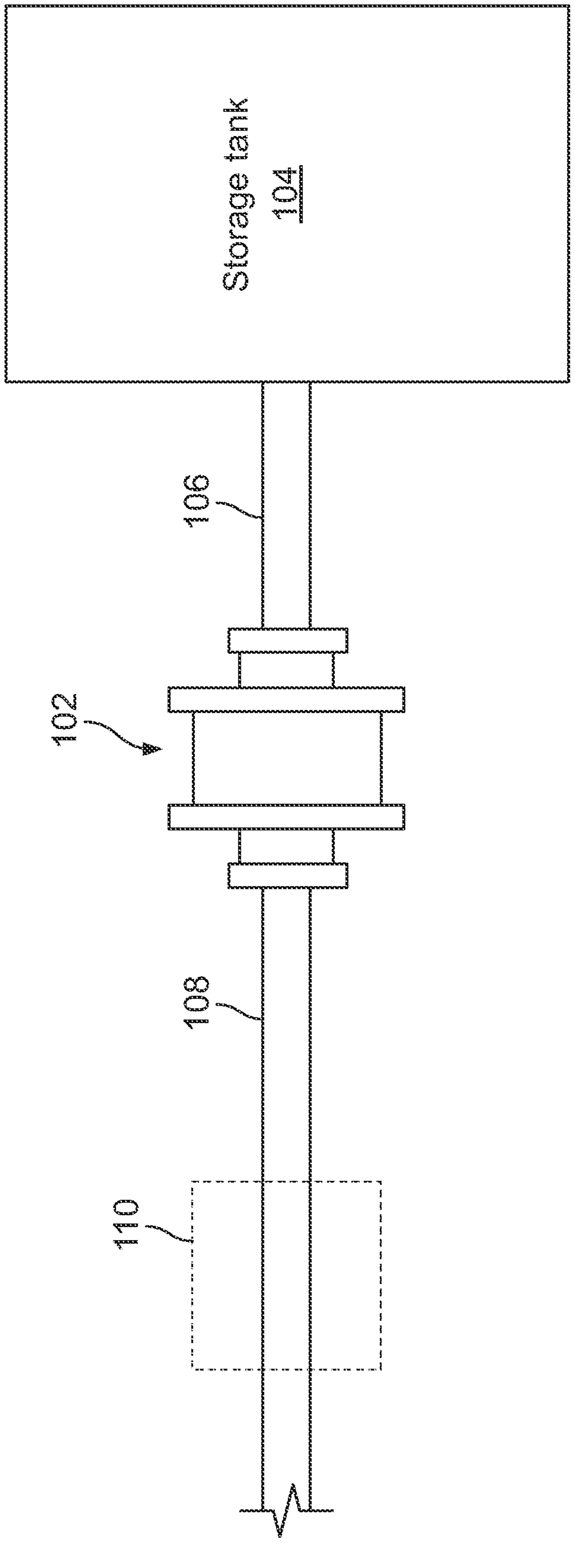
FIG. 1 is a schematic illustration of an example pipe system in which example flame arresters disclosed herein can be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the terms "upstream" and "downstream" refer to the location along a fluid flow path relative to the direction of fluid flow. For example, with respect to a fluid flow, "upstream" refers to a location from which the fluid flows, and "downstream" refers to a location toward which the fluid flows. For example, with regard to a flame arrester, a protected side is said to be upstream of an unprotected side, and a gas is said to flow from the protected side to the unprotected side.

As used herein, "radially" is used to express a point or points along radial vector(s) pointing outward from a body and perpendicular to a central axis of the body. In some examples, a first part is said to extend radially outward from a second part, meaning that the first part protrudes from an outer surface of the second part and along radial vectors perpendicular to a central axis of the second part. As used herein, "axially" is used to express a point or points along axial vector(s) pointing outward from a body and parallel to a central axis of the body. In some examples, a first part is said to extend axially outward from a second part, meaning that the first part extends from an end or side surface of the second part in a direction parallel to a central axis of the second part.

DETAILED DESCRIPTION

Many flame arresters (e.g., in-line detonation flame arresters, in-line deflagration flame arresters, etc.) are connected between a first pipe (e.g., an upstream pipe) and a second pipe (e.g., a downstream pipe), which are included in a system, such as a natural gas piping system, a vapor control system, a fluid transportation system, a ventilation system, etc. In some cases, gases within or downstream of the second pipe can combust due to pressurization, machining, electrical surges, etc. Once the gases ignite downstream of the flame arrester, a flame propagates back upstream toward the gas source and the flame arrester.

The flame arrester is included in the system to prevent the propagation of the flame from the second pipe to the first pipe. Typically, flame arresters include a flame cell disposed within a body and two reducer sections connected to opposite sides of the body. The flame cell may be composed of alternating layers of flat and corrugated ribbons defining a plurality of channels therethrough. As the burning gas flows through the flame cell, the walls of the channels absorb heat and extinguish the flame before the burning gas can propagate to the other side. The flame cell is also disposed between two crossbars. Each of the crossbars includes a plurality of spokes (e.g., four, six, eight spokes, etc.) protruding from a central hub. Generally, the spokes are affixed (e.g., welded, etc.) to the body.

The flame cell is designed such that a combination of cross-sectional areas of the channels corresponds to a cross-sectional area of the first and second pipes. Thus, as a fluid (e.g., gas, vapor, mixture, etc.) flows from the first pipe to the second pipe, the flow rate is not restricted due to a sudden decrease in cross-sectional area. To achieve this correspondence between cross-sectional areas, the flame cell has a larger diameter than the inner diameter of the first and second pipes. Likewise, the body in which the flame cell is housed includes an inner diameter corresponding to the diameter of the flame cell.

Known flame arresters include end housings on both sides of the body to adapt the inner diameters of the first and second pipes to the inner diameter of the body. These known end housings include a connection flange, a body flange, and a cone or reducer section between the connection flange and the body flange. Based on the direction of flow, the reducer section converges or diverges along a length between the connection flange and the body flange. In other words, as the fluid flows from the first pipe to the flame cell, the reducer gradually expands from the inner diameter of the first pipe to the inner diameter of the body. Likewise, as the fluid flows from the flame cell to the second pipe, the reducer section gradually contracts from the inner diameter of the body to the inner diameter of the second pipe.

Due to the configurations of the reducer sections, the axial length of the flame arrester can be relatively large. In particular, as the diameter of the flame cell increases, the length of the reducer sections increases because of the need to gradually transition between the pipe diameter and the flame cell diameter. As such, the larger the flame arrester, the larger the size of the overall system package in which the flame arrester is integrated, the fewer the number of other components and/or subsystems that can be included in the system, the heavier the flame arrester, the heavier the overall system package, etc. Furthermore, an axially larger flame arrester can be difficult to integrate into an existing system due to current specifications and, thus, may prompt modifications, fabrications, and/or additional costs associated with installation.

Furthermore, the end housing with the reducer section can be expensive to manufacture based on the variable cross-section design and smooth transition along the length of the reducer section. In many cases, the reducer section is also welded to the body flange and the connection flange. Such weld lines can be prone to failure modes (e.g., cracking, etc.), especially under conditions caused by detonation or deflagration.

As used herein, the term "deflagration" refers to an unconfined flame propagation that moves along a distance at subsonic speeds (e.g., speeds less than the speed of sound, such as 343 meters per second (m/s)). As used herein, the term "detonation" refers to an explosion and/or flame propagation that moves along a distance at or above the speed of sound and is strong enough to cause shock waves to form in the gas. When detonation occurs downstream of the flame arrester, the flame and corresponding shock waves can travel upstream into the reducer section at supersonic speeds.

Due to the nature of compressible flow, the speed of the shock wave can increase along the length of the reducer section as the nozzle diverges and the inner diameter of the nozzle increases. As the speed of the shock wave increases, the forces acting on the body, the flame cell, and the crossbar also increase. Thus, the reducer sections can affect the structural integrity of the flame arrester and the associated joints (e.g., welds, etc.) during detonation.

Disclosed herein are example flame arresters having example end housings that do not have reducer sections or cones as seen in known flame arresters. The end housings of example flame arresters disclosed herein include pipe sections (e.g., necks, cylinders, conduits, etc.) with connection flanges and body flanges extending from axially opposing ends thereof. In some examples, the inner diameters of the pipe sections are constant between the connection flanges and body flanges and, thus, do not expand or reduce in diameter as in known flame arrester reducer sections. Therefore, because the example end housings do not require a reducer section for gradually transitioning between two diameters as in known flame arresters, the example end housings disclosed herein can be significantly shorter in the axial direction. As such, the axial lengths of example flame arresters disclosed herein are reduced compared to known flame arresters. This enables the example flame arresters to be fitted more easily into existing systems. For example, when replacing an older flame arrester with a new flame arrester having a larger diameter flame cell, the axial length of the new flame arrester may be the same, such that the new flame arrester can fit within the existing space (e.g., between two pipes).

Truncation of the end housings decreases the overall lengths of example flame arresters disclosed herein, allowing more space available for other subsystems and/or components. Additionally or alternatively, example flame arresters disclosed herein allow the overall system to consume less space. Additionally or alternatively, by enabling the end housings to remain shorter in the axial direction, the bodies of example flame arresters can be elongated (in the axial direction) to include more and/or thicker flame cells (e.g., disk-shaped flame cells, etc.) while maintaining a similar or reduced length and increasing the extinguishing capabilities thereof.

Along with the length, the weight of example flame arresters disclosed herein is also reduced. As such, fewer and/or less robust supporting structures are needed to affix (e.g., mount, suspend, undergird, etc.) example flame arresters in the system. Furthermore, the reduction in weight reduces the stress and strain imparted on fasteners (e.g., bolts, etc.), flanges, and/or interconnections between the end housings and the pipes to which example flame arresters are attached.

Example flame arresters disclosed herein are also less expensive to manufacture because the pipe sections of the end housings can have straight pathways, as opposed to the nozzles of the reducer sections, which have complex converging or diverging designs and are costly to fabricate. Furthermore, some of the example end housings disclosed herein can be constructed from commercially available parts, which lowers the costs of production.

As mentioned above, the reducer sections of known flame arresters have contoured and/or conical designs that accelerate shock waves. Because the end housings of example flame arresters disclosed herein have constant (e.g., non-changing) inner diameters, the shock waves caused by detonation do not accelerate along the lengths between the connection flanges and the flame cells. Thus, example flame arresters disclosed herein reduce the forces of the shock waves acting on the end housings, the crossbars, the flame cell(s), and the body.

To further improve structural integrity, example flame arresters disclosed herein allow the crossbars to be axially longer (or thicker) and extend between the flame cell and the body flanges. As disclosed in further detail herein, the body flanges have flat plates/portions parallel with the flame cells such that the crossbars can contact (or rest against) inner surfaces of the body flanges, an inner surface of the body, and corresponding sides of the flame cell. As such, the crossbars can be set in place without fasteners (e.g., welding, etc.).

Also, because the crossbars extend between the body flanges and opposing surfaces of the flame cell, the crossbars also define sections (e.g., quadrants, etc.) therebetween. Such sections cause shock waves to break up into smaller shock waves, which reduces the overall force acting on the flame cell. In other words, the total effect of separate, smaller shock waves can be less impactful than that of full, intact shock wave(s). As such, the truncated end housings reduce an overall impact detonation shock waves can have on example flame arresters disclosed herein.

Turning now to the figures, FIG. 1 is a schematic illustration of an example system 100 including an example flame arrester 102. Any of the example flame arresters disclosed herein can be implemented as the example flame arrester 102. The system 100 of FIG. 1 is configured as a piping system for ventilating and/or transporting a gas (e.g., natural gas, etc.) from a storage tank 104. For example, the system 100 may include a network of pipes that transport the gas from the storage tank 104 to one or more downstream locations (e.g., factories, residential homes, power plants, etc.). In the illustrated example, the flame arrester 102 is connected between a first pipe 106 (e.g., upstream pipe, protected pipe, etc.) and a second pipe 108 (e.g., downstream pipe, unprotected pipe, etc.). For example, the flame arrester 102 can be bolted to the first and second pipes 106, 108. Gas flows from the first pipe 106 and through the flame arrester 102 to the second pipe 108. The flame arrester 102 is configured to prevent a flame from propagating between the first and second pipes 106, 108, thereby preventing further damage upstream or downstream of the flame arrester 102. For example, assume an ignition source 110 causes combustion of the gases in a downstream location. For example, the ignition source 110 can be a machine (e.g., pump, motor, generator, etc.) that causes an unexpected pressure increase, temperature increase, spark, etc. If the ignition source 110 combusts the gas, a chain reaction occurs along the second pipe 108, and the resulting flame propagates upstream toward the storage tank 104. However, the flame arrester 102 includes flame cell(s) (disclosed below) to extinguish the flame and prevent the occurrence of catastrophic events, such as an explosion of the tank 104. The example flame arrester 102 may be bi-directional, in that the flame arrester 102 can also prevent flame propagation from an upstream location to a downstream location.

The example flame arrester 102 of FIG. 1 is configured as an in-line flame arrester based on the position between the first and second pipes 106, 108. In other examples, the flame arrester 102 is configured as an end-of-line flame arrester 102, and the system 100 does not include the second pipe 108. In such examples, the ignition source 110 is located outside of the system 100. For example, the ignition source 110 can be a lightning strike that occurs in open atmosphere where the gas is being ventilated.

The example flame arrester 102 can be an in-line detonation flame arrester or an in-line deflagration flame arrester based on the structural and performance properties thereof. An in-line detonation flame arrester is able to withstand flames and shock waves propagating at supersonic velocities (e.g., 350 m/s, 400 m/s, etc.) with high pressure fronts (e.g. 1400 kilopascals (kPa) absolute, 1700 kPa absolute, 2000 kPa absolute, etc.) associated with the detonation of a flammable gas mixture. An in-line deflagration flame arrester is able to withstand flames and shock waves propagating at subsonic velocities (e.g., 200 m/s, 300 m/s, etc.) with low pressure fronts (e.g., 800 kPa absolute, 1200 kPa absolute, etc.) associated with the deflagration of a flammable gas mixture. Therefore, while some of the example flame arresters disclosed herein are described as being an in-line detonation flame arrester, any of the example flame arresters disclosed herein can also be considered and/or used as an in-line deflagration flame arrester.

Figure 2:
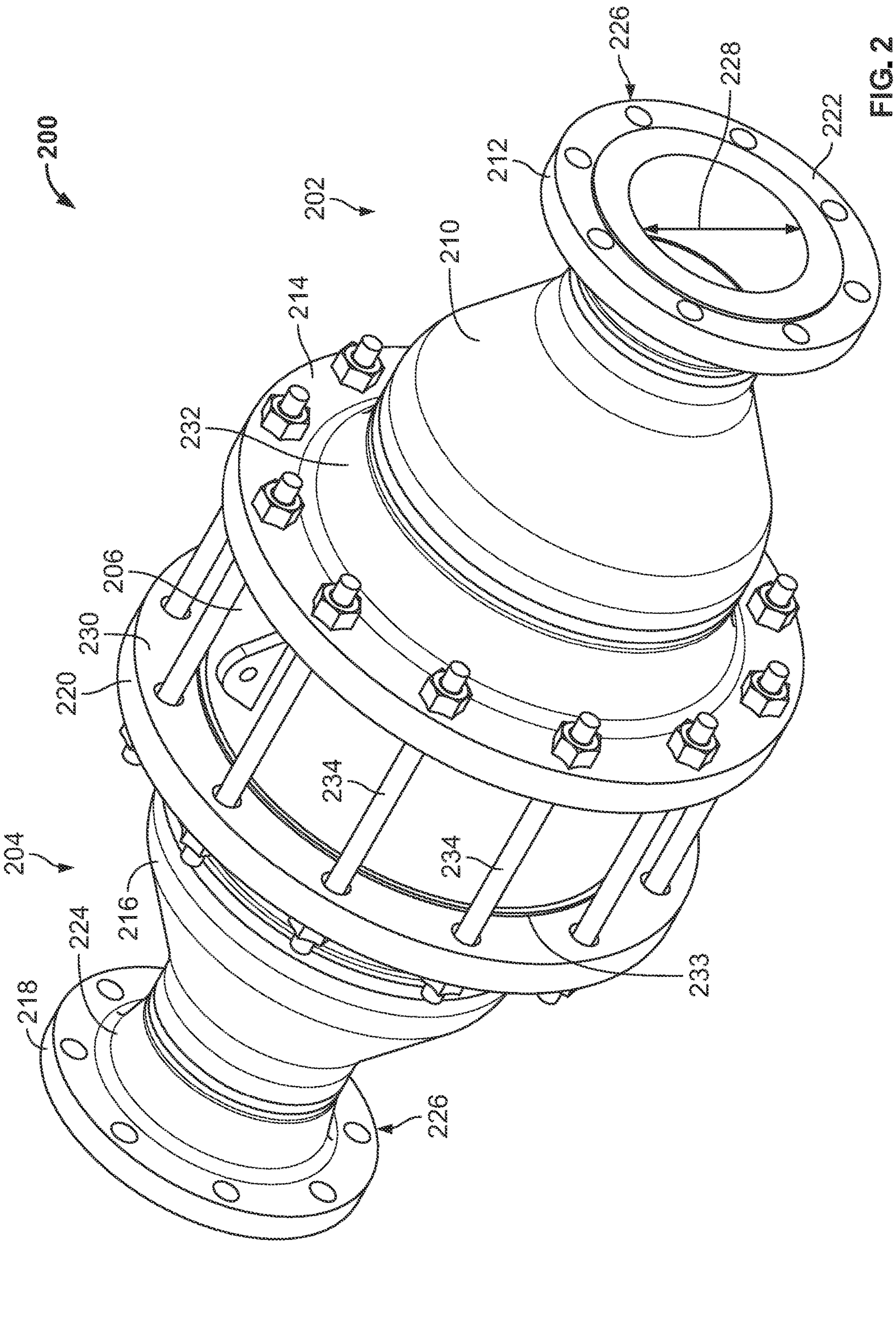
FIG. 2 (Prior Art)
FIG. 2 is a perspective view of a known flame arrester.
Figure 3:
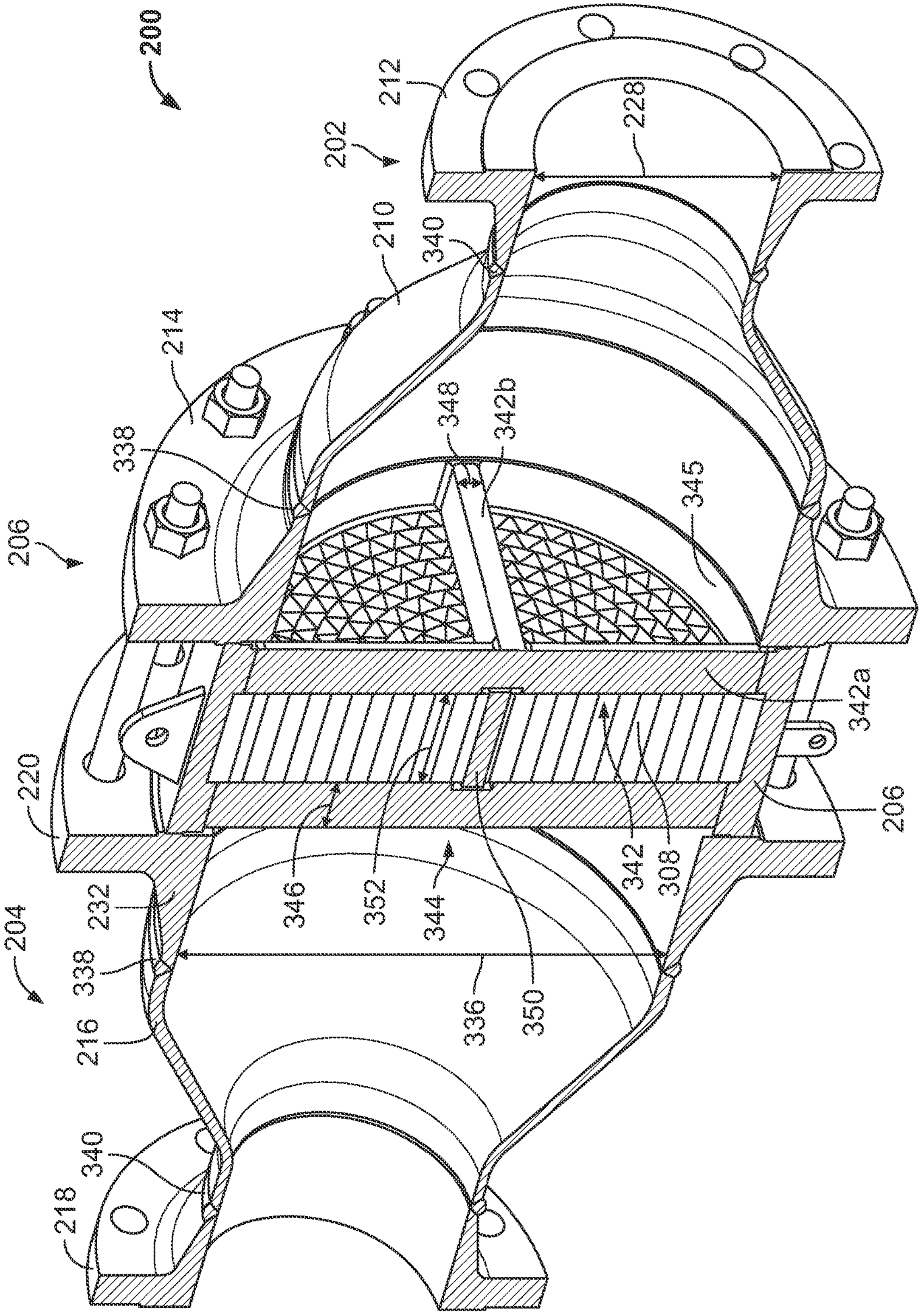
FIG. 3 (Prior Art)
FIG. 3 is a cross-sectional perspective view of the known flame arrester of FIG. 2.
Figure 4:
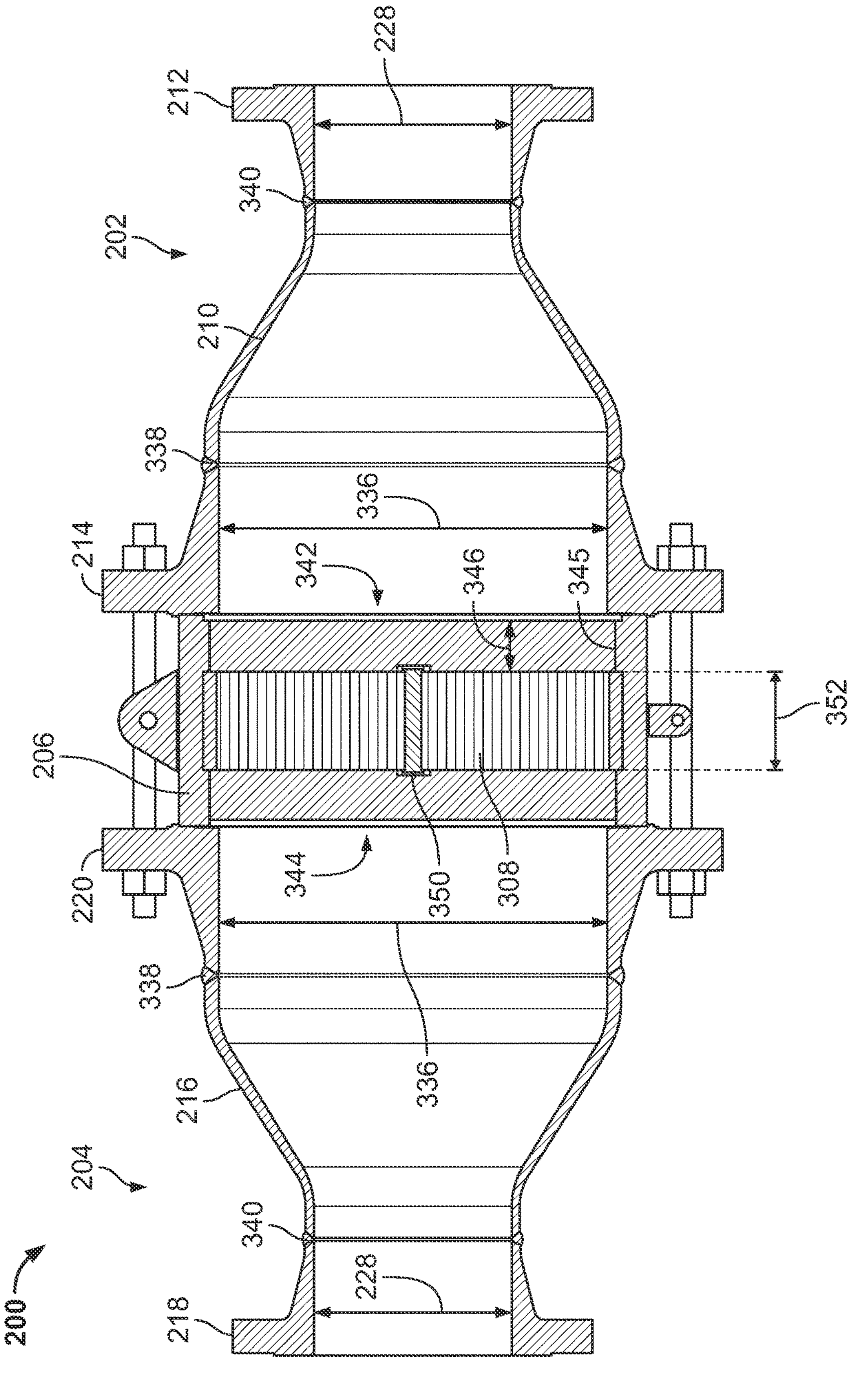
FIG. 4 (Prior Art)
FIG. 4 is a cross-sectional side view of the known flame arrester of FIG. 2.

Before describing the details of the example flame arresters disclosed herein, a brief description of a known flame arrester is provided in connection with FIGS. 2-4. FIG. 2 is a perspective view of a known flame arrester 200, FIG. 3 is a cross-sectional perspective view of the flame arrester 200, and FIG. 4 is a cross-sectional side view of the flame arrester 200. As shown in FIG. 2, the flame arrester 200 includes a first end housing 202, a second end housing 204, and a body 206. The first and second end housings 202, 204 are reducers or expanders that change in diameter. The first end housing 202 includes a first reducer section 210 (sometimes referred to as a nozzle or cone), a first connection flange 212 at one end of the first reducer section 210, and a first body flange 214 at the opposite end of the first reducer section 210. Similarly, the second end housing 204 includes a second reducer section 216, a second connection flange 218, and a second body flange 220. Typically, flame arresters (e.g., the flame arrester 200, example flame arresters described below, etc.) are symmetrical such that the first and second end housings 202, 204 are similar or identical while acknowledging real-world tolerances, imperfections, differences, etc. The body 206 includes a flame cell (shown in further detail in FIGS. 3 and 4) and is coupled between the first and second end housings 202, 204.

The first and second connection flanges 212, 218 are used to couple the flame arrester 200 between two pipes of a piping system. The first and second connection flanges 212, 218 each include an interface surface 222 (only labeled in connection with the first end housing 202) to contact flanges of the two pipes of the piping system. The first and second connection flanges 212, 218 also each include a neck 224 (only labeled in connection with the second end housing 204) protruding away from the interface surface 222 and the adjacent pipes. Typically, the first and second connection flanges 212, 218 are each single/cohesive/disparate parts manufactured (e.g., machined, die casted, etc.) from a same metallic material (e.g., aluminum, steel, etc.). The first and second connection flanges 212, 218 include through holes 226 to receive bolts for coupling the first and second flanges 212, 218 to respective flanges of the upstream and downstream pipes. Furthermore, the first and second connection flanges 212, 218 have a first inner diameter 228 that corresponds to an inner diameter of the pipes connected to the flame arrester 200.

The first and second body flanges 214, 220 are included to frame and affix the body 206 in place within the flame arrester 200. The first and second body flanges 214, 220 each include an interface surface 230 (only labeled in connection with the second end housing 204) to contact opposing ends of the body 206. The first and second body flanges 214, 220 each include a neck 232 protruding away from the interface surface 230 and the body 206. The interface surface 230 may include a circular recess 233 to position the body 206 and ensure slippage does not occur. The recess 233 can also contain sealants (e.g., O-rings, gaskets, etc.) and/or adhesives (e.g., epoxies, etc.) to further attach the body 206 to the body flanges 214, 220. The first and second body flanges 214, 220 are bolted together via bolts 234, which clamp the body 206 between the first and second end housings 202, 204. Similar to the connection flanges 212, 218, each of the first and second body flanges 214, 220 can be manufactured from a same metallic material.

As shown in FIGS. 3 and 4, the flame arrester 200 includes a flame cell 308 (or flame cell assembly with a single flame cell or flame cell element) disposed in the body 206. The flame cell 308 has a plurality of channels that enables the gas to flow through the flame cell 308. As shown in FIGS. 3 and 4, the first and second body flanges 214, 220 each have a second inner diameter 336 that is the same or substantially the same as an inner diameter of the body 206. The first and second reducer sections 210, 216 increase in diameter from the first inner diameter 228 to the second inner diameter 336. When a flame travels toward the flame arrester 200 at subsonic speeds due to deflagration, this changing diameter of the reducer sections 210, 216 reduces the speed of the flame. However, when the flame propagates at supersonic speeds due to detonation, the flame creates a shock wave that propagates upstream into the flame arrester 200. In such scenarios, when the shock wave reaches the first or second reducer section 210, 216, such waves reflect off the angled surfaces (or walls) and the reflected waves can collide in a same region, which can increase the re-ignition risk on the protected side of the flame arrester 200. The cone shape of the reducer sections 210, 216 ensures there are no regions in the flame arrester 200 where gases can swirl and/or create turbulence. Such regions can create low pressure areas that can negatively affect flow characteristics through the flame arrester 200, such as a reduction in flow rate of the gas. The reducer sections 210, 216 also typically have precise tolerances to ensure proper flow characteristics (e.g., reduced flowrates, deflection angles, etc.) occur during deflagration and/or detonation. Such tolerances are associated with higher fabrication costs.

Typically, the first and second reducer sections 210, 216 are manufactured separately from the connection flanges 212, 218 and the body flanges 214, 220. Then the body flanges 214, 220 are coupled to one end of the reducer sections 210, 216 via first joints 338 and the connection flanges 212, 218 are coupled to the opposite ends of the reducer sections 210, 216 via second joints 340. Generally, the first and second joints 338, 340 are weld lines (e.g., square welds, single "v" welds, single bevel welds, etc.).

As shown in FIGS. 3 and 4, the flame arrester 200 includes a first crossbar 342 and a second crossbar 344 on opposite sides of the flame cell 308. The first and second crossbars 342, 344 are joined (e.g., welded) to an inner surface 345 of the body 206 with the flame cell 308 interposed therebetween. The crossbars 342, 344 structurally support the flame cell 308 and prevent or limit the flame cell 308 from moving axially and/or becoming unraveled in the case of a detonation.

The first and second crossbars 342, 344 include a first dimension (or axial length) 346 and a second dimension (or thickness) 348. Generally, each of the crossbars 342, 344 includes two intersecting bars (only labeled in connection with the first crossbar 342) that extend across the inner diameter of the body 206. For instance, as shown in FIG. 3, the first crossbar 342 includes a first bar **342*a* that fully extends across the inner diameter of the body 206 as well as a second bar 342*b* that fully extends across the inner diameter of the body 206 and is perpendicular to the first bar. The second crossbar 344** similarly includes two bars.

As shown in FIGS. 3 and 4, the flame cell 308 is positioned within the body 206 at an axial midpoint of the flame arrester 200. The flame cell 308 includes alternating layers of flat and corrugated metal ribbons wound around a hub 350 such that a plurality of channels extend from a first side of the flame cell 308 to a second side of the flame cell 308, the first side opposite the second side. The metal ribbons are made of heat-conductive metal that can absorb heat from the combusted gas as the flame propagates from the second side to the first side. The flame cell 308 can be designed to a thickness 352 based on how much heat absorption is desired of the flame cell 308.

Figure 5:
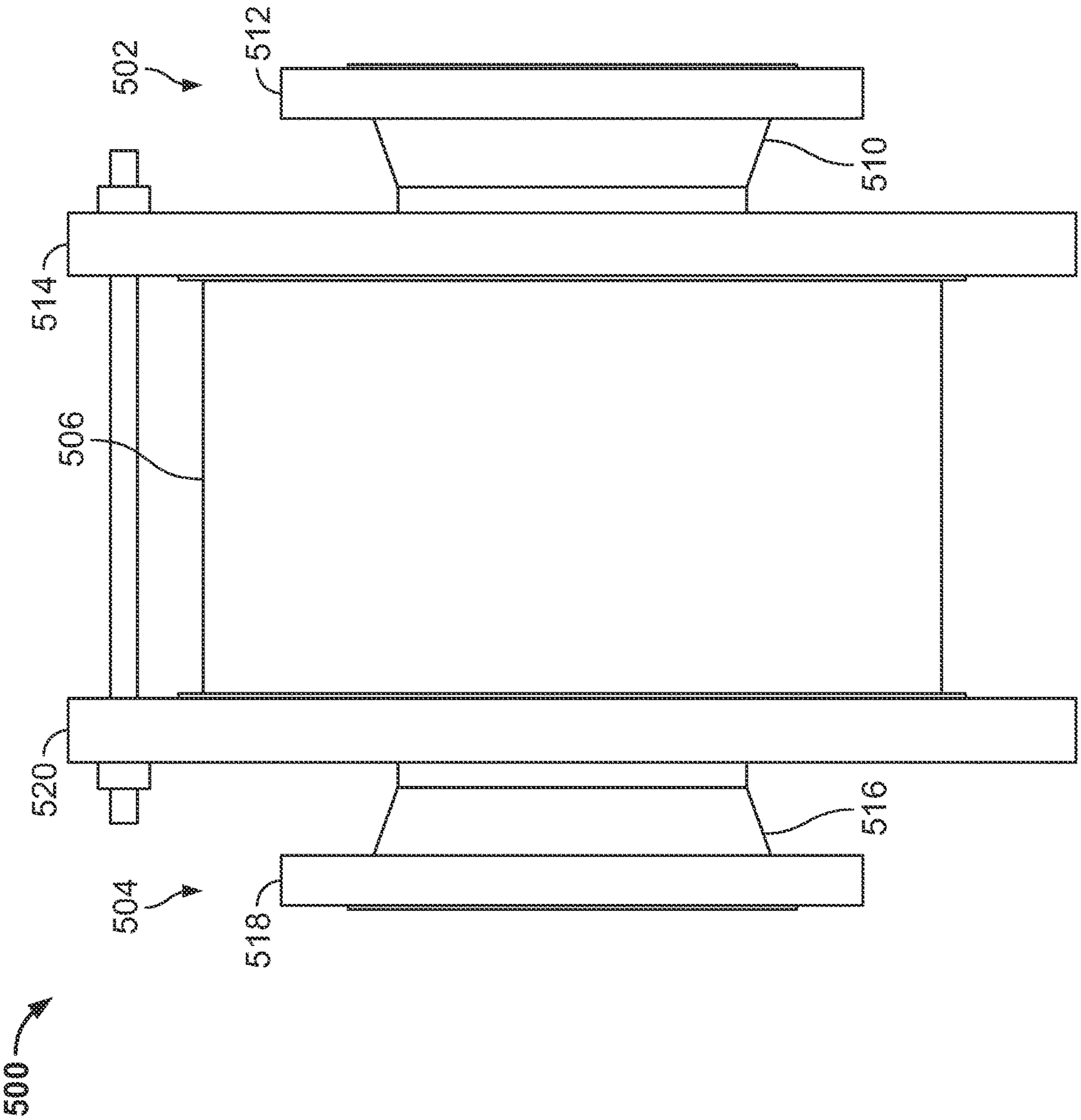
FIG. 5 is a side view of a first example flame arrester constructed in accordance with teachings disclosed herein.
Figure 6:
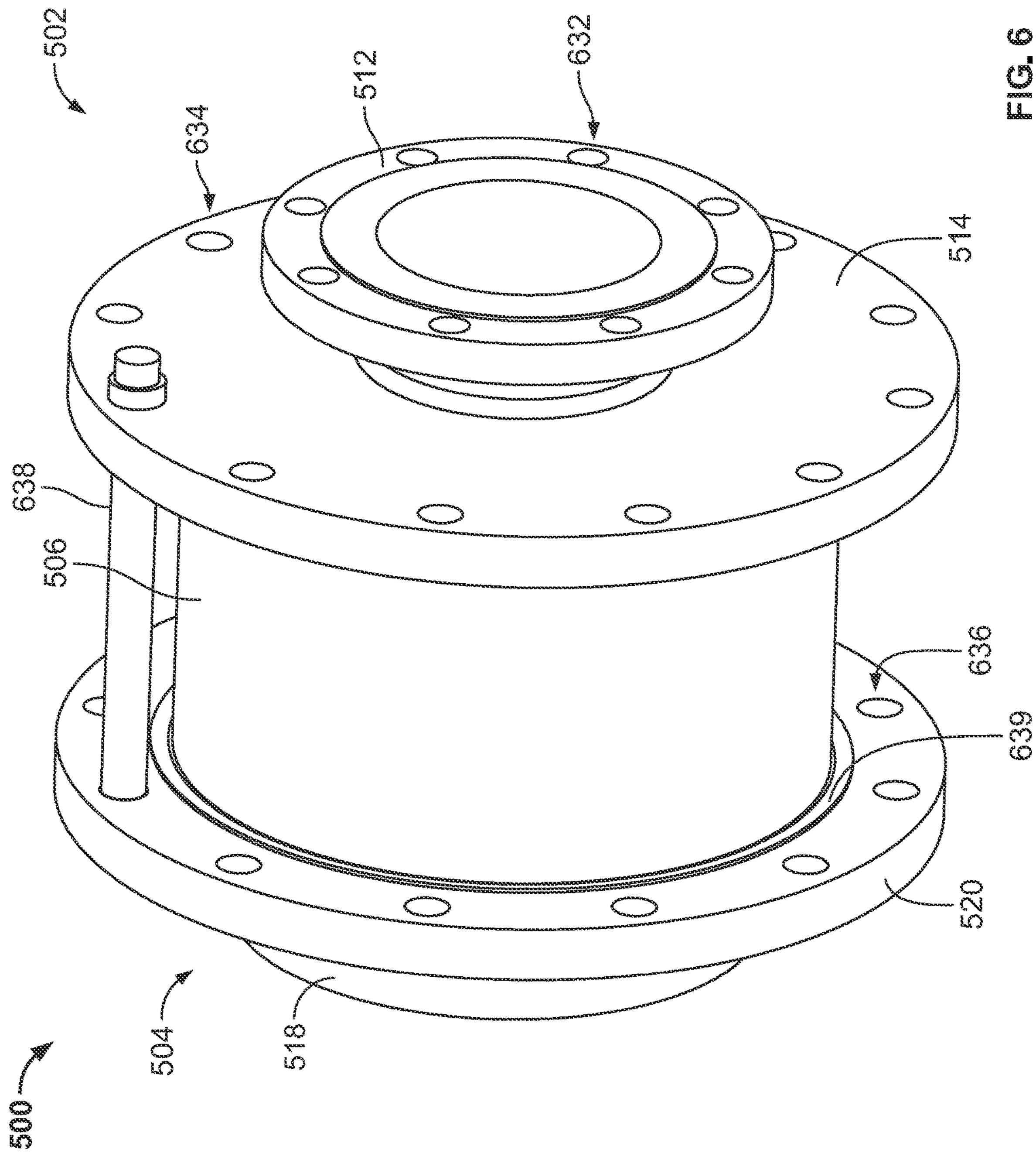
FIG. 6 is a perspective view of the first example flame arrester of FIG. 5.
Figure 7:
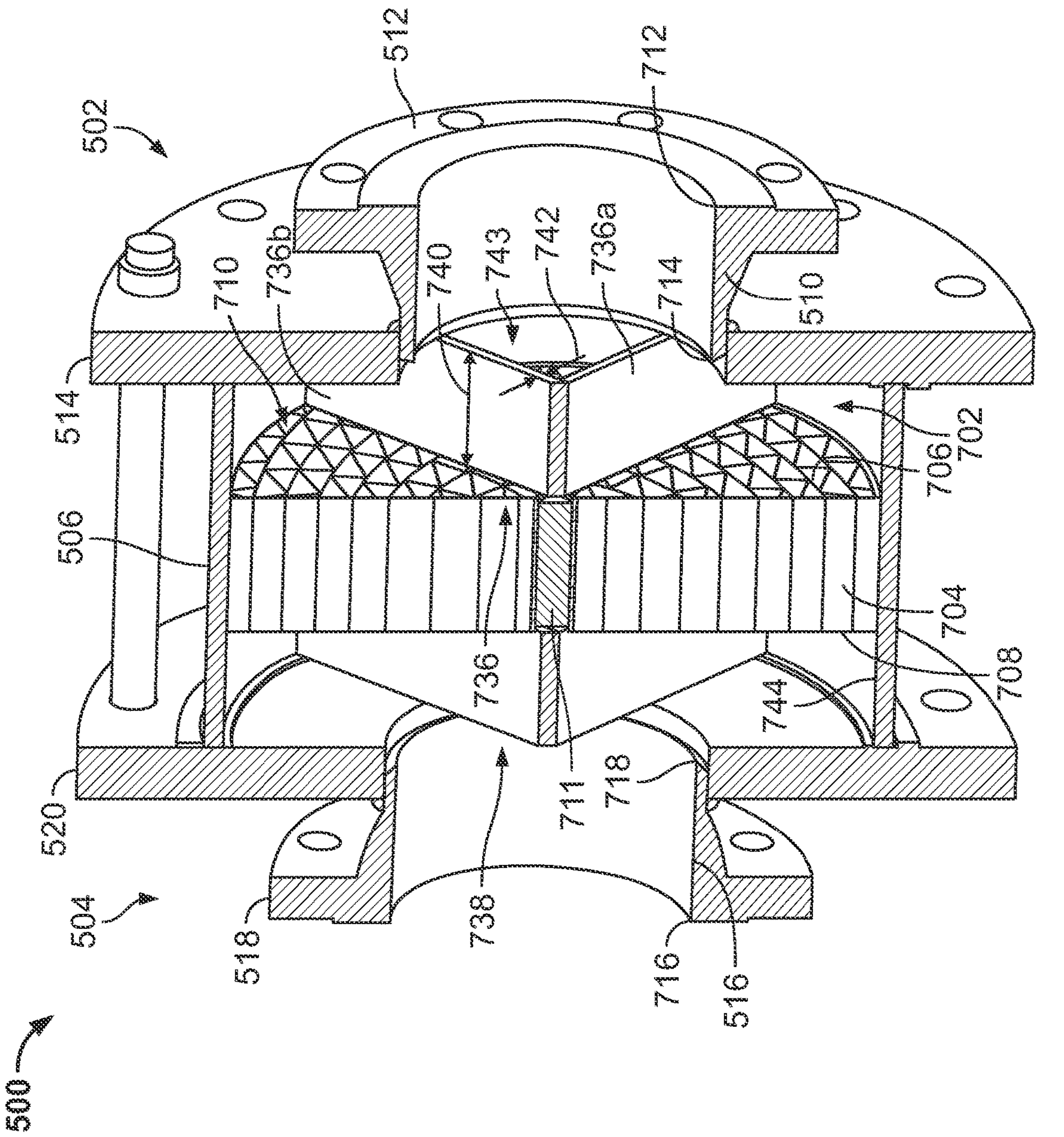
FIG. 7 is a cross-sectional perspective view of the first example flame arrester of FIG. 5.
Figure 8:
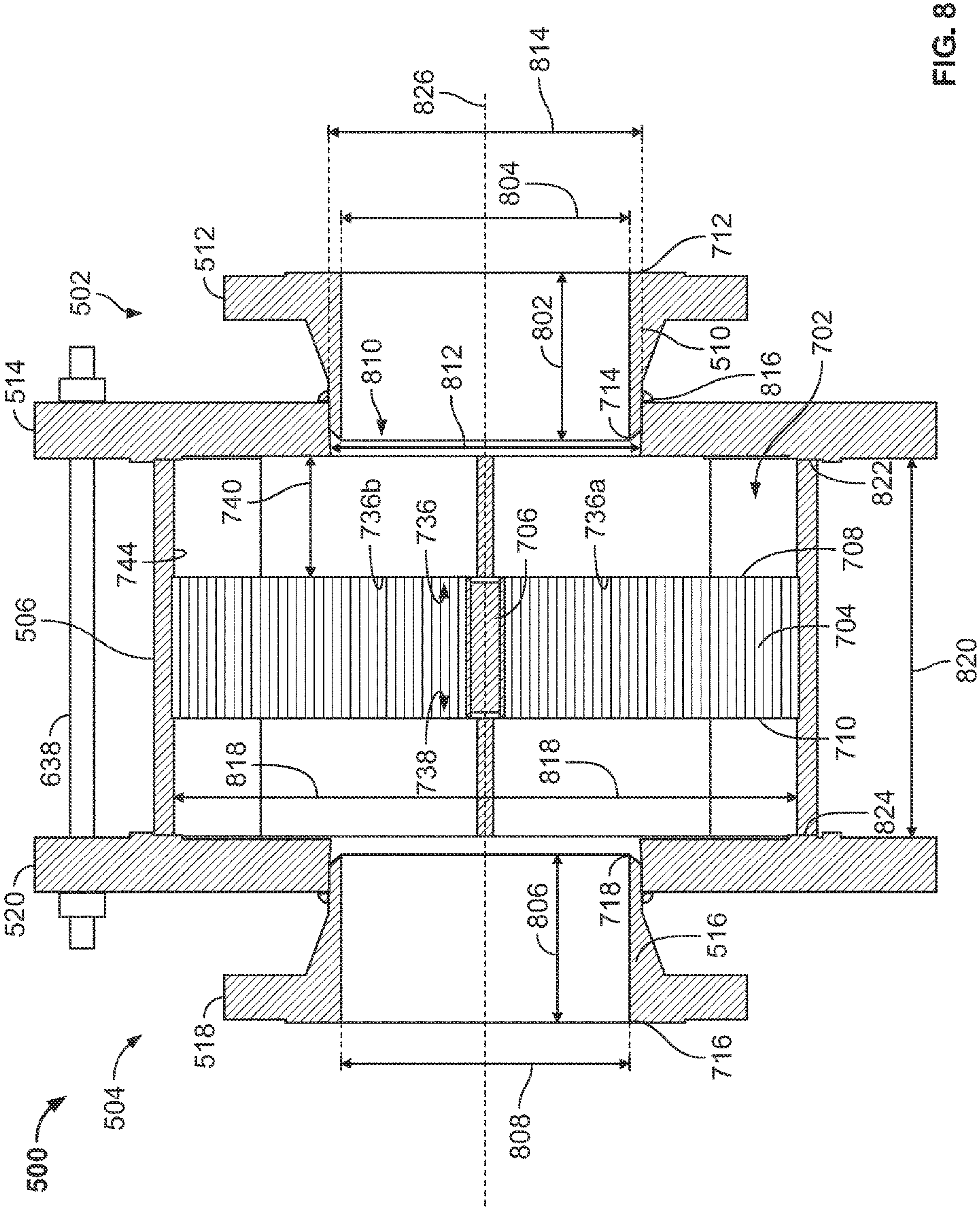
FIG. 8 is a cross-sectional side view of the first example flame arrester of FIG. 5.

FIGS. 5-8 illustrate a first example flame arrester 500 constructed in accordance with teachings disclosed herein. FIG. 5 is a side view of the flame arrester 500, FIG. 6 is a perspective view of the flame arrester 500, FIG. 7 is a cross-sectional perspective view of the flame arrester 500, and FIG. 8 is a cross-sectional side view of the flame arrester 500. The example flame arrester 500 can be implemented as the flame arrester 102 shown in FIG. 1. In the illustrated examples of FIGS. 5-8, the flame arrester 500 is implemented as an in-line detonation flame arrester. In particular, the flame arrester 500 is configured to withstand flames and shock waves propagating at supersonic velocities with high pressure fronts associated with the detonation of a flammable gas mixture. Additionally or alternatively, the flame arrester 500 can be implemented an in-line deflagration flame arrester. In such examples, the flame arrester 500 is configured to withstand flames and shock waves propagating at subsonic velocities with low pressure fronts associated with the deflagration of a flammable gas mixture.

In the illustrated example of FIG. 5, the flame arrester 500 includes a first end housing 502, a second end housing 504, and a body 506 (e.g., a housing) coupled (e.g., clamped) between the first and second end housings 502, 504. The body 506 contains a flame cell, as shown in further detail herein. In the illustrated example, the first end housing 502 includes a first pipe section 510, a first connection flange 512 at one end of the first pipe section 510, and a first body flange 514 at the opposite end of the first pipe section 510. Similarly, the second end housing 504 includes a second pipe section 516, a second connection flange 518 at one end of the second pipe section 516, and a second body flange 520 at the opposite end of the second pipe section 516. In some examples, the flame arrester 500 is symmetrical such that the first end housing 502 and the second end housing 504 are identical, mirrored, and/or otherwise share a substantially similar design and/or configuration. For example, in the illustrations of FIGS. 5-8, both the first and second pipe sections 510, 516 include straight inner passageways to facilitate laminar flow into the body 506. It should then be appreciated that descriptions of the first end housing 502 and the elements thereof can likewise apply to the second end housing 504 and associated elements. However, in other examples, the first and second end housings 502, 504 are not identical, and the flame arrester 500 is not symmetrical.

The first and second connection flanges 512, 518 are used to couple the flame arrester 500 between upstream and downstream pipes (e.g., first pipe 106, second pipe 108, etc.) of a piping system (e.g., pipe system 100, etc.). As shown in FIG. 6, the first connection flange 512 includes openings 632

(e.g., through-holes) to receive fasteners (e.g., bolts, means for fastening, etc.) for coupling to a flange of a pipe (e.g., the first pipe 106). The number and placement of the openings 632 can correspond to the hole or bolt pattern of the adjacent pipe flange. The second connection flange 518 similarly includes openings for receiving fasteners to couple the connection flange 518 to another pipe (e.g., the second pipe 108).

The first and second body flanges 514, 520 are used to couple (e.g., clamp) the body 506 between the first and second end housings 502, 504. As shown in FIG. 6, the first body flange 514 includes openings 634 (e.g., through-holes) and the second body flange 520 includes openings 636. The openings 634, 636 receive fasteners 638 (only one of which is shown and labeled in FIG. 6) extending between the first and second body flanges 514, 520. The fasteners 638 may be bolts or tie rods. When the fasteners 638 are tightened, the first and second body flanges 514, 520 are moved toward each other, thereby clamping the body between the first and second body flanges 514, 520. In other examples, the first and second body flanges 514, 520 and the body 506 can be coupled via other chemical and/or mechanical techniques (e.g., welding, etc.). In some examples, the first and second body flanges 514, 520 include circular recesses 639 (shown in connection with the second body flange 520) to position the first and second end housings 502, 504 in alignment with the body 506. The recesses 639 can also contain sealants and/or adhesives to further attach the body 506 to the body flanges 514, 520.

Referring to FIG. 7, the body 506 is cylindrical and defines an inner cavity or passageway 702. As shown in FIG. 7, the flame arrester 500 includes an example flame cell 704 (sometimes referred to as a flame cell element) disposed in the passageway 702 of the body 506. The flame cell 704 is disk-shaped and has a diameter that corresponds with a diameter of the passageway 702. In some examples, the diameter of the flame cell 704 is less than the diameter of the passageway 702, and the flame arrester 500 includes an insert surrounding a circumference of the flame cell 704. In some examples, the flame cell 704 is referred to as a flame cell assembly having a single flame cell or flame cell element.

In the illustrated example, the flame cell 704 has a first side 706, a second side 708 opposite the first side 706, and a plurality of channels 710 (one of which is referenced in FIG. 7) extending between the first and second sides 706, 708. In the illustrated example, the flame arrester 500 includes a hub 711, which forms a center of the flame cell 704. In some examples, the flame cell 704 is constructed of alternating layers of flat and corrugated ribbons wrapped around the hub 711. The combination of flat and corrugated (or wavy) ribbon layers defines the plurality of channels 710 extending along an axial length between the first side 706 and the second side 708. In some examples, an end of a flat ribbon and an end of a wavy ribbon are fixed to the hub 711, and the ribbons are wound around the hub 711 to form the alternating layers. In some examples, the flame cell 704 is constructed from a thermally conductive metal (e.g., copper, etc.) that enables relatively quick heat transfer from the flame to the flame cell 704. Thus, the flame cell 704 extinguishes the flame as the flame propagates from one side (e.g., the second side 708) to another side (e.g., the first side 706).

The number of wrapped layers defines the number of channels 710 within the flame cell 704. Furthermore, an overall surface area within the plurality of channels 710 defines the heat transfer capability of the flame arrester 500. As such, the diameter of the flame cell 704 and the number of wrapped layers can be adjusted to modify the amount of heat the flame cell 704 can remove from the flame. Additionally or alternatively, the flame arrester 500 can include an axially longer flame cell 704 and/or multiple flame cells 704 to improve the effectiveness of the flame arrester 500. The number of channels 710 also defines a flow area through the flame cell 704. Thus, the number of channels 710 can also be modified such that gas flow through the flame arrester 500 is not restricted during operation. While in some examples the flame cell 704 is constructed of flat and corrugated ribbons, in other examples the flame cell 704 can be constructed in other manners. For example, the flame cell 704 may be plate of metal with drilled holes.

The flame cell 704 is disposed within the passageway 702 between two crossbars 736, 738 (disclosed in further detail below). The body 506 and the crossbars 736, 738 may support the flame cell 704 such that the flame cell 704 does not move axially, bend along the diameter, and/or become unwound during detonation. In some examples, the flame cell 704 is coupled to the body 506. For example, the flame cell 704 may be coupled to the body 506 via an interference fit such that some or all of an outer surface or wrap of the flame cell 704 contacts the body 506 without gaps or clearances. In some examples, the flame cell 704 is tightly wound or disposed inside a tubular sleeve, which may fit inside the body 506 with some radial clearance. In some such examples, the crossbars 736, 738 axially support the flame cell 704 such that movement or shifting does not occur, and the body 506 (and/or tubular sleeve) radially supports the flame cell 704 such that unwinding does not occur. In some examples, the crossbars 736, 738 are welded to the sides 706, 708 of the flame cell 704. In some examples, the body 506 includes a circumferential recess to receive the flame cell 704.

In the illustrated example, the first pipe section 510 of the first end housing 502 has a first end 712 and a second end 714 opposite the first end 712. In the illustrated example, the first connection flange 512 is coupled to and extends from the first pipe section 510 at the first end 712, and the first body flange 514 is coupled to and extends from the first pipe section 510 at the second end 714. Similarly, the second pipe section 516 of the second end housing 504 has a third end 716 and a fourth end 718 opposite the third end 716. The second connection flange 518 is coupled to and extends from the second pipe section 516 at the third end 716, and the second body flange 520 is coupled to and extends from the second pipe section 516 at the fourth end 718.

Referring to the illustrated example of FIG. 8, the first pipe section 510 has a first length 802 between the first end 712 and the second end 714. In the illustrated example, the first pipe section 510 has a first inner diameter 804 that is constant or approximately constant (e.g., within a manufacturing tolerance of being constant) along the first length 802. Thus, the first pipe section 510 has a straight inner passageway along the first length 802 and does not have a conical reducer or expander that increases or decreases in diameter as seen in the known flame arrester 200. As such, shock waves created from detonations do not accelerate in first end housing 502 and do not reflect off of the first pipe section 510 at angles. Rather, the shock waves reflect from the second end 714 of the pipe section 510 in parallel, thereby attenuating shock wave forces exerted on the flame cell 704. Similarly, the second pipe section 516 has a second length 806 between the third end 716 and the fourth end 718. The second pipe section 516 has a second inner diameter 808 that is constant or approximately constant along the second length 806. In some examples, the first and second lengths 802, 806 are the same. In some examples, the first and second inner diameters 804, 808 are the same. However, in other examples, the first length 802 is different than the second length 806, and/or the first inner diameter 804 is different than the second inner diameter 808.

In some examples, the first and second end housings 502, 504 are constructed of commercially available parts, which can be easily assembled, and which reduce costs. For example, in the illustrated example of FIGS. 5-8, the first connection flange 512 and the first pipe section 510 are formed or constructed as single unitary part or component (e.g., a monolithic structure). This part is sometimes referred to as a weld-neck flange or a slip-on flange. Such a part can be commercially available having pre-determined dimensions. Additionally, in the illustrated example, the first body flange 514 is a blind flange having an opening 810 to receive the second end 714 of the first pipe section 510. The opening 810 has an inner diameter 812 that corresponds to an outer diameter 814 of the second end 714 of the first pipe section 510. In some examples, the first body flange 514 is coupled to the second end 714 of the first pipe section 510 via a weld joint 816. Additionally or alternatively, the first body flange 514 can be coupled via other mechanical and/or chemical fasteners. In other examples, the opening of the first body flange 514 is a threaded hole, and the second end 714 of the first pipe section 510 is threaded. Thus, the first pipe section 510 and the first body flange 514 may be coupled via a threaded connection. In other examples, the first pipe section 510, the first connection flange 512, and the first body flange 514 may be separate parts that are coupled (e.g., welded) together to form the first end housing 502. For example, the first connection flange 512 and the first body flange 514 may be blind flanges that are coupled (e.g., welded) to ends of the first pipe section 510. The second end housing 504 can be constructed in a similar manner as the first end housing 502.

Therefore, because the first and second end housings 502, 504 can be constructed from commercially available parts, the first and second end housings 502, 504 are relatively inexpensive and easily modifiable. The availability and inexpensiveness of such parts enables a variety of size combinations between the flame cell 704 and the first and second end housings 502, 504. Additionally, dimensions of the first and second end housings 502, 504 and the first and second connection flanges 512, 520 can be easily modified to properly align with and connect to pipes. Thus, the flame arrester 500 is adaptable for a variety of pipe systems.

In the illustrated example, the flame arrester 500 includes the first crossbar 736, which is positioned between the first side 706 of the flame cell 704 and the first body flange 514. The flame arrester 500 also includes the second crossbar 738, which is positioned between the second side 708 of the flame cell 704 and the second body flange 520. In the illustrated example, the first crossbar 736 is clamped between the first side 706 of the flame cell 704 and the first body flange 514. Likewise, the second crossbar 738 is clamped between the second side 708 of the flame cell 704 and the second body flange 520. Similar to the first and second end housings 502, 504, the first and second crossbars 736, 738 are identical, mirrored, and/or otherwise substantially similar to each other. As such, descriptions given in connection with the first crossbar 736 can likewise apply to the second crossbar 738. However, in some examples, the first and second crossbars 736, 738 are not substantially similar. For example, the first crossbar 736 can include six bars (e.g., arms, spokes, etc.), and the second crossbar 738 can include four bars. Although the first and second crossbars 736, 738 are aligned in the illustrated example, in some examples, the crossbars 736, 738 are offset or circumferentially oriented at different angles. For example, the second crossbar 738 may be rotated, offset, or circumferentially oriented at 45 degrees relative to the first crossbar 736.

As shown in FIGS. 7 and 8, the first crossbar 736 has a length 740 extending axially between the first side 706 of the flame cell 704 and the first body flange 514. In the illustrated example, the body 506 has a third inner diameter 818 along a third length 820 extending between a first end 822 and a second end 824 opposite the first end 822. In some examples, the third length 820 of the body 506 extends between the first and second body flanges 514, 520. In the illustrated example, the first end 822 is proximate or coupled to the first body flange 514, and the second end 824 is proximate or coupled to the second body flange 520. The third inner diameter 818 is larger than the first and second inner diameters 804, 808. The first crossbar 736 of FIGS. 7 and 8 includes two intersecting bars (a first bar 736*a* and a second bar 736*b*) extending radially across the third inner diameter 818 of the body 506. Only half of each of the bars 736*a*, 736*b* is shown in the cross-sectional views of FIGS. 7 and 8. The body 506 supports a radial load (or weight) of the first crossbar 736, and the first body flange 514 supports an axial position of the first crossbar 736. However, the first crossbar 736 is not coupled (e.g., welded) to the body 506 or the first body flange 514. Instead, the first crossbar 736 is clamped or constrained between the first side 706 of the flame cell 704 and the first body flange 514.

In some examples, the first crossbar 736 is in contact with the flame cell 704 and the first body flange 514. Similarly, the second crossbar 738 is clamped or constrained between the second side 708 of the flame cell 704 and the second body flange 520. Therefore, in this example, the body 506 has an axial length corresponding to a combined axial length of the first crossbar 736, the flame cell 704, and the second crossbar 738. Thus, those components are fixed between the first and second body flanges 514, 520. However, in other examples, one or more surfaces of the first crossbar 736 is/are coupled (e.g., welded) to the body 506 and/or the first body flange 514. Additionally or alternatively, in some examples, the first crossbar 736 does not contact the first body flange 514, and gaps exist between the first crossbar 736 and the first body flange 514.

Because the length 740 of the first crossbar 736 extends axially between the first body flange 514 and the flame cell 704, the first crossbar 736 defines multiple individual internal flame chambers within the body 506. More specifically, because the length 740 is increased, the first and second bars 736*a*, 736*b* and the inner surface 744 of the body 506 function as sidewalls of the chambers. The first crossbar 736 separates (or divides) a flame into the chambers when the flame propagates toward the flame arrester 500 from a downstream location and interacts with the first crossbar 736. Furthermore, because the first inner diameter 804 is less than the third inner diameter 818, the first body flange 514 functions as a ceiling of the internal chambers. The first body flange 514 inhibits the separated flames in the individual chambers from mixing together. In the illustrated example, the first crossbar 736 includes four bars (or spokes), which create four chambers (e.g., detonation chambers or deflagration chambers) in a portion of the body 506. In the illustrated example of FIG. 7, a first internal flame chamber 743 is shown.

As a flame propagates along the first pipe section 510 from the first end 712 to the second end 714 and interacts with the first crossbar 736, the first crossbar 736 divides the flame into four smaller distinct flames within the four individual chambers. Moreover, in the event of a detonation, the shock wave of the propagating flame fractures and reflects off of the first crossbar 736 and the inner surface 744, which results in weaker shock waves in the internal chambers. Thus, the flame arrester 500 essentially operates as multiple smaller flame arresters. For example, when the flame arrester 500 has the detonation performance of a six inch by twelve inch flame arrester, it can be appreciated that the detonation performance may be converted to that of four individual three inch by six inch flame arresters due to the four internal chambers. In some examples, the cumulative detonation force of each of the smaller shock waves within the internal chambers is less than the detonation force of a single, unbroken shock wave. Thus, the internal chambers allow the flame arrester 500 to withstand larger detonations as well as extinguish detonation and/or deflagration flames more efficiently.

In the illustrated example, the first crossbar 736 also improves structural performance of the flame arrester 500. It should be appreciated that bending strength (e.g., flexural strength, etc.) of a rectangular object (e.g., the first bar 736*a* and/or the second bar 736*b*) is equal to the inverse of the square of the width (e.g., the length 740) of the rectangular object. Thus, the first crossbar 736 has an increased bending strength because of the increased length 740. In other words, the first crossbar 736 can withstand higher detonation forces without plastically deforming due to the increased length 740. The bending strength of the first crossbar 736 is further increased because the body 506 and the first body flange 514 support the first crossbar 736 on multiple sides. Specifically, the body 506 supports radial loads of the first crossbar 736, and the first body flange 514 supports axial loads of the first crossbar 736. Such axial support further enables the first crossbar 736 to have the reduced thickness 742. Thus, a combination of the length 740 of the first crossbar 736 and the support of the first body flange 514 improves bending strength while reducing the thickness 742 and the weight of the first crossbar 736. The configuration of the first crossbar 736 and the additional axial support of the first body flange 514 is not found in known flame arresters (e.g., the flame arrester 200, etc.). It should therefore be appreciated that the first and second end housings 502, 504, and, in turn, the first and second crossbars 736, 738, enable the flame arrester 500 to withstand more severe detonations.

When conical sections (or reducers) are replaced with the first and second pipe sections 510, 516 having constant (or straight) passageways, the abrupt increase from the first inner diameter 804 to the third inner diameter 818 may cause swirling or turbulence of the flowing gasses. Such swirling may occur during normal operation but may also become exaggerated due to downstream detonations. In some examples, this swirling forms near distal perimeters of the body 506 where the inner surface 744 meets the body flanges 514, 520. Furthermore, the gasses may swirl circumferentially about the axial centerline 826. Inclusion of the crossbars 736, 738 and the multiple internal chambers creates partitions or barriers in the passageway 702 of the body 506. Thus, the first and second crossbars 736, 738 inhibit swirling of gases in a circumferential direction within the body 506 based on the internal chambers, which can improve flow characteristics, reduce detonation volume, and reduce the risk of re-ignition on the protected side.

As labeled in FIG. 7, the first crossbar 736 has a thickness 742. In some examples, this thickness 742 is less than the thicknesses of known crossbars (e.g., first crossbar 342 of FIG. 3, etc.). The thickness 742 is reduced because the first crossbar 736 can be supported without the need for welding. In some examples, the decreased thickness 742 reduces the overall weight of the first crossbar 736 and increases the volume of the multiple internal chambers. The increased length 740 improves the bending strength of the first crossbar 736 and enables the first crossbar 736 to be supported on multiple sides by the flat surface of the first body flange 514 and an inner surface 744 of the body 506. This arrangement makes the supportive function of the first crossbar 736 more robust, makes the loading of the first crossbar 736 more efficient, and reduces the moments and stresses acting on the first crossbar 736.

In some examples, the first pipe section 510 extends beyond the first body flange 514 and into the passageway 702. Thus, the length 740 of the first crossbar 736 may extend between the second end 714 of the first pipe section 510 and the first side 706 of the flame cell 704. Additionally or alternatively, the length 740 may be a first length, and the first crossbar 736 may envelope the second end 714 of the first pipe section 510, such that the first crossbar 736 also has a second length extending between the first body flange 514 and the first end 706 of the flame cell 704, the second length longer than the first length 740.

In the illustrated example, the first crossbar 736 includes the two bars 736*a*, 736*b* extending radially across the inner diameter 818 of the body 506. The two bars 736*a*, 736*b* intersect at an axial centerline 826 of the flame arrester 500. In other examples, the first crossbar 736 can include more than two bars (e.g., three, four, etc.) extending radially across the inner diameter 818 of the body 506 that meet at the axial centerline 826 of the flame arrester 500. In some examples, the bars 736*a*, 736*b* are coupled together via welded T-joints. In some examples, the bars 736*a*, 736*b* intersect and overlap at a cross-lap joint and are coupled together at the cross-lap joint. In other examples, the first crossbar 736 includes a plurality of spokes joined to a central hub and extending between the central hub and the inner surface 744 of the body 506. The central hub may extend between both the first and second crossbars 736, 738 and may act as the hub 711 about which the flame cell 704 is formed. In some examples, each hub may extend beyond the first and second crossbars 736, 738 and may be joined to form the hub 711. In such examples, the hub 711, the first crossbar 736, the second crossbar 738, and the flame cell 704 may be joined as a single sub-assembly. In other examples, the first crossbar 736 may only include one bar extending radially across the inner diameter.

Figure 9:
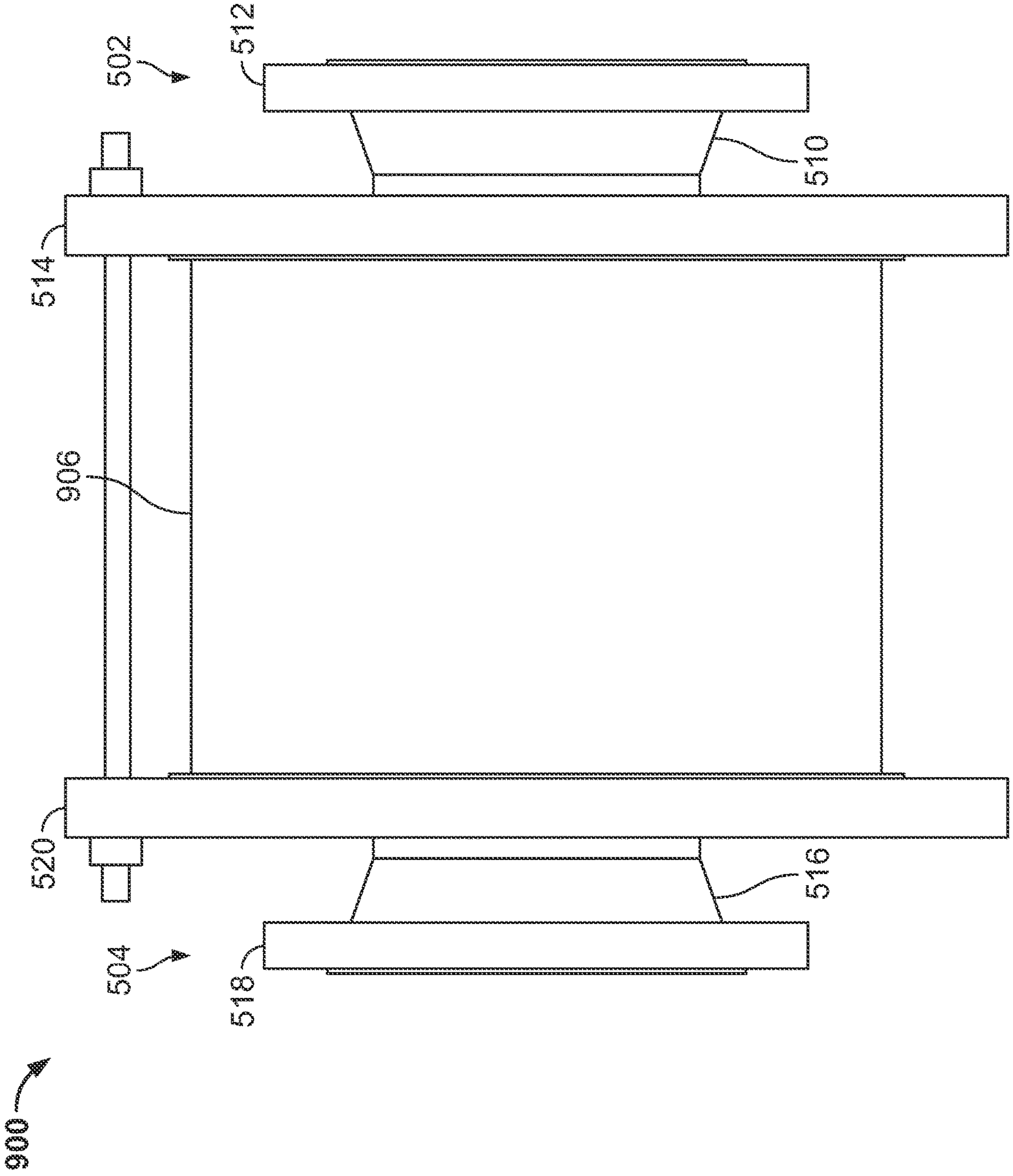
FIG. 9 is a side view of a second example flame arrester constructed in accordance with teachings disclosed herein.
Figure 10:
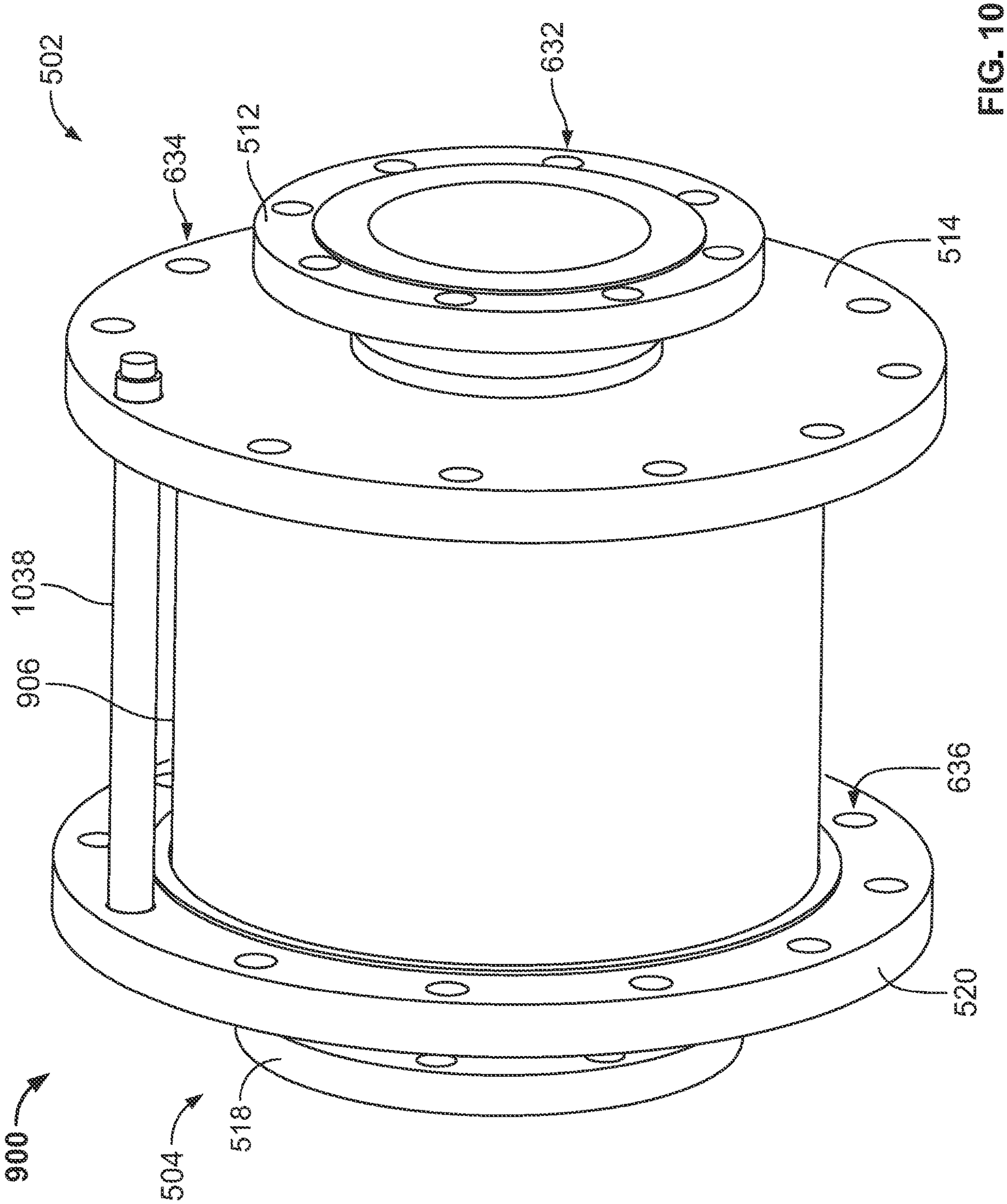
FIG. 10 is a perspective view of the second example flame arrester of FIG. 9.
Figure 11:
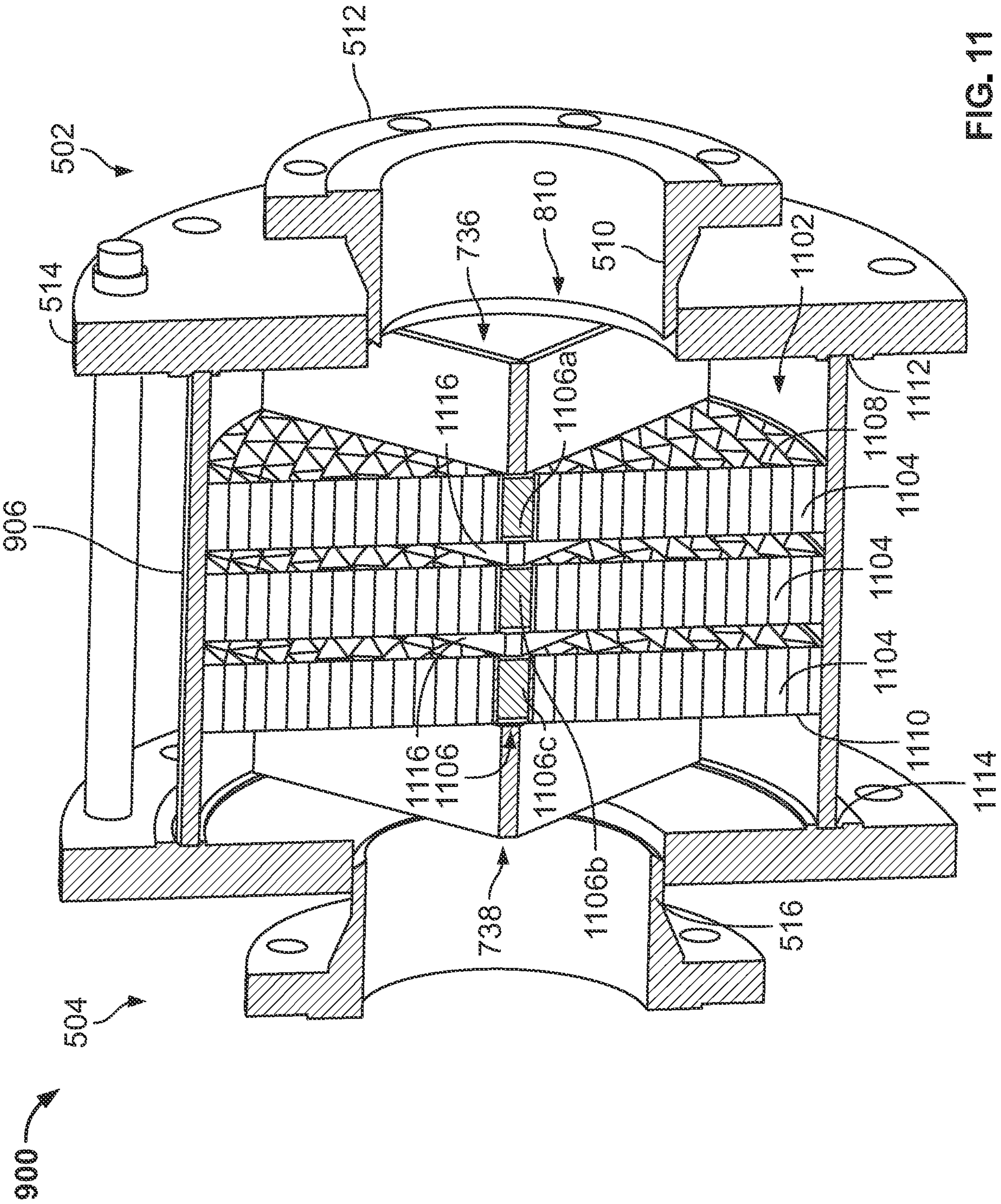
FIG. 11 is a cross-sectional perspective view of the second example flame arrester of FIG. 9.
Figure 12:
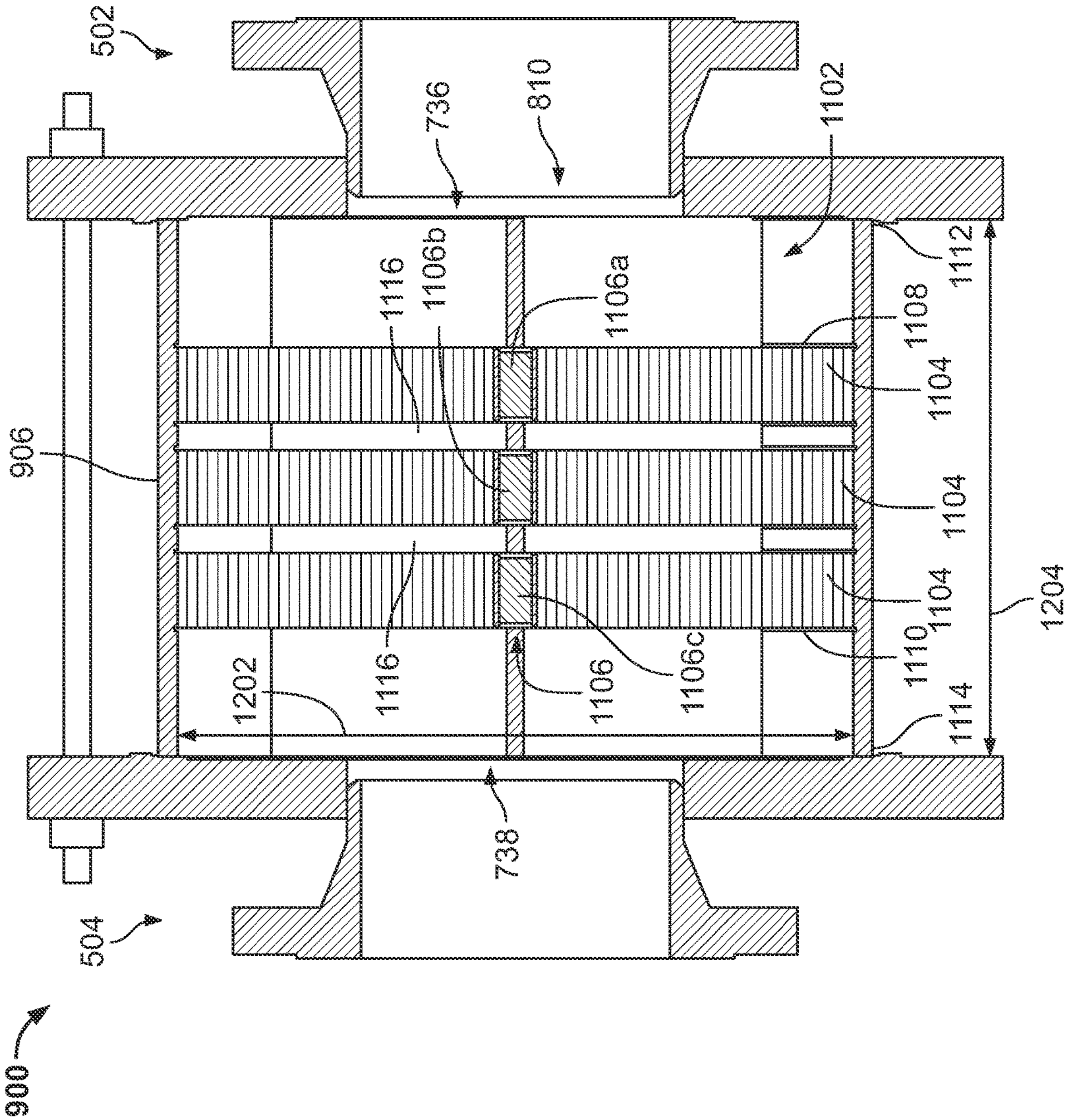
FIG. 12 is a cross-sectional side view of the second example flame arrester of FIG. 9.

FIGS. 9-12 illustrate a second example flame arrester 900 constructed in accordance with teachings disclosed herein. FIG. 9 is a side view of the flame arrester 900, FIG. 10 is a perspective view of the flame arrester 900, FIG. 11 is a cross-sectional perspective view of the flame arrester 900, and FIG. 12 is a cross-sectional side view of the flame arrester 900. The example flame arrester 900 can be implemented as the flame arrester 102 shown in FIG. 1. Similar to the first flame arrester 500, the second flame arrester 900 can be implemented as an in-line detonation flame arrester and/or an in-line deflagration flame arrester.

In the illustrated examples of FIGS. 9 and 10, the flame arrester 900 includes a body 906 coupled (e.g., clamped) between the first and second end housings 502, 504. The body 906 contains a plurality of flame cell elements, as shown in further detail herein. The body 906 is axially longer to accommodate the plurality of flame cell elements, which increases the flame arrestment capabilities and overall weight thereof. In the illustrated example, the first end housing 502 and the second end housing 504 are the same as like elements of the first flame arrester 500. However, in some examples, some or all of the like elements can be replaced, modified, and/or reconfigured to properly implement the second flame arrester 900. For example, the length of the first pipe section 510 of the second flame arrester 900 can be reduced to make an overall length of the second flame arrester 900 substantially similar to that of the first flame arrester 500.

In the illustrated example, the first body flange 514 includes the openings 634 and the second body flange 520 includes the openings 636 to receive fasteners 1038 (only one of which is shown and labeled in FIG. 10) extending between the first and second body flanges 514, 520. The fasteners 1038 may be implemented similarly to the fasteners 638 of FIGS. 6-8. However, the fasteners 1038 are elongated based on the length of the body 906.

Referring to FIG. 11, the body 906 is cylindrical and defines an inner cavity or passageway 1102. As shown in FIG. 11, the flame arrester 900 includes an example plurality of flame cells 1104 disposed in the passageway 1102 of the body 906. In some examples, the plurality of flame cells 1104 are referred to as a flame cell assembly having a plurality of flame cells or flame cell elements. The second flame arrester 900 includes the plurality of flame cells 1104 to improve the extinguishing capabilities thereof. Each of the flame cells 1104 has an axial length, and the combination of each of the axial lengths is greater than the axial length of the flame cell 704. In some examples, the combination of each of the axial lengths is the same as the axial length of the flame cell 704. Thus, the flame arrester 900 may include the plurality of flame cells 1104 based on availability and/or desired flow properties. In this example, the flame arrester 900 includes three flame cells 1104. In other examples, the flame arrester 900 can include more or fewer flame cells (e.g., two, four, five, etc.). In some examples, the flame arrester 900 includes one flame cell with an axial length that corresponds to the combined axial lengths of the example plurality of flame cells 1104.

Each of the flame cells 1104 may be implemented and/or configured substantially similarly to the flame cell 704. For example, the flame arrester 900 includes a plurality of hubs 1106 about which each of the plurality of flame cells 1104 is formed (e.g., wrapped, constructed, etc.). In the illustrated example, the plurality of hubs 1106 corresponds to the plurality of flame cells 1104. In some examples, the flame arrester 900 includes one hub, and the plurality of flame cells 1104 are formed around the one hub. The one hub may extend axially between a first side 1108 of the plurality of flame cells 1104 and a second side 1110 of the plurality of flame cells 1104.

As shown in FIGS. 11 and 12, the body 906 of the flame arrester 900 has a first end 1112 and a second end 1114 opposite the first end 1112. As shown in FIG. 12, the body 906 has a fourth inner diameter 1202 along a fourth length 1204 extending between the first and second ends 1112, 1114. In some examples, the fourth inner diameter 1202 corresponds to an outer diameter of the plurality of flame cells 1104. In some examples, the fourth inner diameter 1202 is the same as the third inner diameter 818. In the illustrated example, the fourth length 1204 of the body 906 is longer than the third length 820 of the body 506 because the overall axial length of the plurality of flame cells 1104 is longer than the axial length of the flame cell 704.

In the illustrated example of FIGS. 11 and 12, the flame arrester 900 includes spacers 1116 disposed between the plurality of flame cells 1104 to improve the flow rate through the flame arrester 900. The spacers 1116 can be implemented as partitions, crossbars, and/or screens to ensure that the plurality of flame cells 1104 do not contact each other. In some examples, the spacers 1116 have the same shape as and are aligned with the crossbars 736, 738. As mentioned previously, flame cells have channels to permit gasses to flow freely therethrough. If the flame cells 1104 are in contact and not perfectly aligned, the channels of the flame cells 1104 may become obstructed. Thus, if the flame arrester 900 does not include the spacers 1116, flow can be restricted due to a misalignment of the flame cells 1104. In other words, the flame arrester 900 includes the spacers 1116 to ensure that the plurality of flame cells 1104 can be oriented in any rotational alignment without restricting flow.

Figure 13:
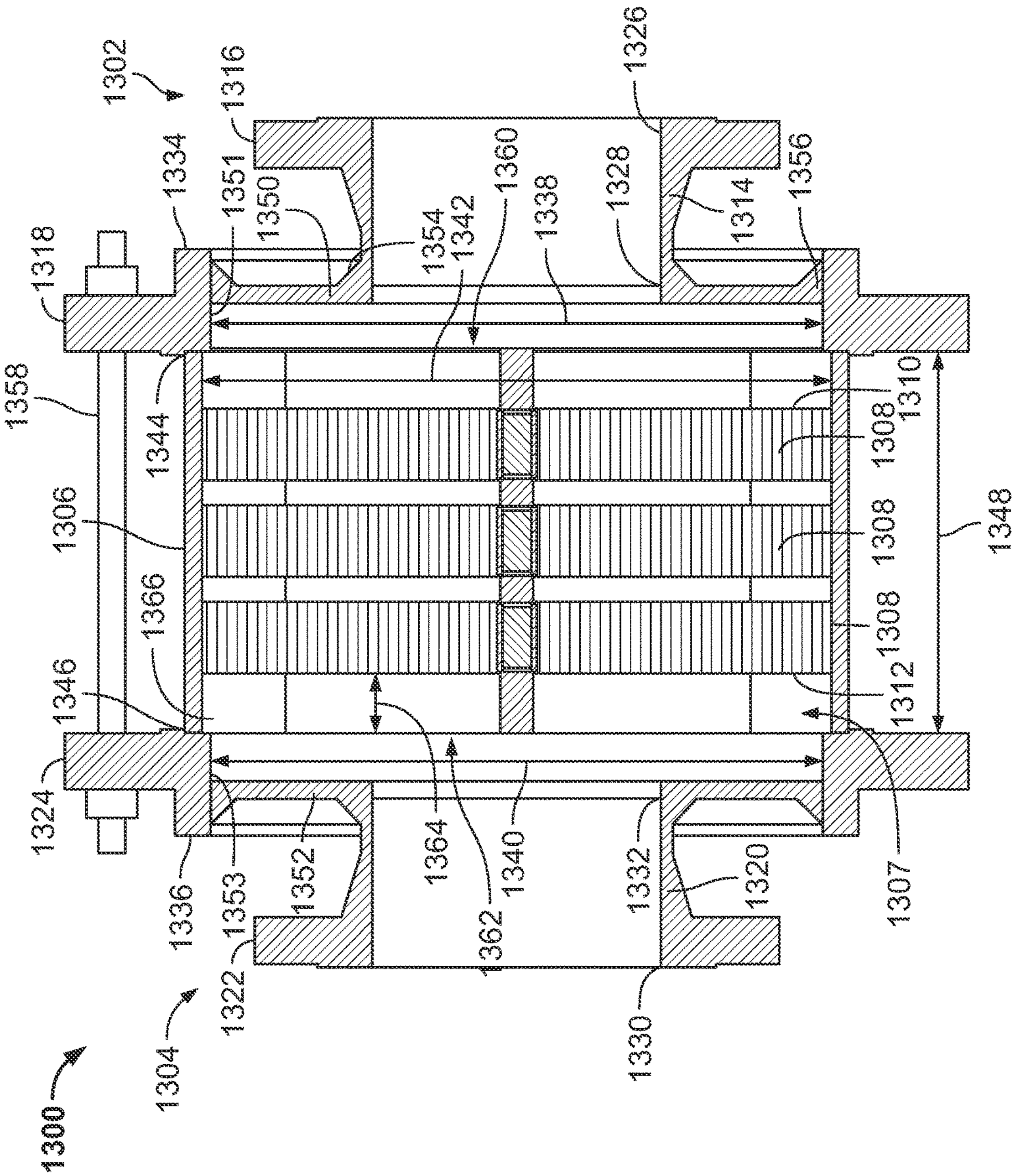
FIG. 13 is a cross-sectional side view of a third example flame arrester constructed in accordance with teachings disclosed herein.

FIG. 13 illustrates a third example flame arrester 1300 constructed in accordance with teachings disclosed herein. FIG. 13 is a cross-sectional side view of the third flame arrester 1300. The example flame arrester 1300 can be implemented as the flame arrester 102 shown in FIG. 1. Similar to the first flame arrester 500 and the second flame arrester 900, the third flame arrester 1300 can be implemented as an in-line detonation flame arrester and/or an in-line deflagration flame arrester.

In the illustrated example, the flame arrester 1300 includes a first end housing 1302, a second end housing 1304, and a body 1306 coupled (e.g., clamped) between the first and second end housings 1302, 1304. The body 1306 is cylindrical and defines an inner cavity or passageway 1307. In some examples, the flame arrester 1300 is symmetrical such that the first end housing 1302 and the second end housing 1304 are identical, mirrored, and/or otherwise share a substantially similar design and/or configuration. It should then be appreciated that descriptions of the first end housing 1302 and the elements thereof can likewise apply to the second end housing 1304 and associated elements. However, in other examples, the first and second end housings 1302, 1304 are not identical, and the flame arrester 1300 is not symmetrical.

As shown in FIG. 13, the third flame arrester 1300 includes a plurality of flame cells 1308 having a first side 1310 and a second side 1312 opposite the first side 1310. In some examples, the plurality of flame cells 1308 are substantially similar to the plurality of flame cells 1104 of FIGS. 11 and 12. As mentioned above, the plurality of flame cells 1308 may be referred to as a flame cell assembly having a plurality of flame cells or flame cell elements. Thus, the third flame arrester 1300 can provide substantially similar performance benefits as disclosed in connection with the second flame arrester 900. However, the body 1306 is axially shorter because the first and second end housings 1302, 1304 and first and second crossbars (disclosed below) have different configurations than those of the second flame arrester 900.

In the illustrated example, first end housing 1302 of the flame arrester 1300 includes a first pipe section 1314, a first connection flange 1316, and a first body flange 1318. In the illustrated example, the second end housing 1304 of the flame arrester 1300 includes a second pipe section 1320, a second connection flange 1322, and a second body flange 1324. The first pipe section 1314 has a first end 1326 and a second end 1328 opposite the first end 1326. The second pipe section 1320 has a third end 1330 and a fourth end 1332 opposite the third end 1330. In some examples, the first and second pipe sections 1314, 1320 and the first and second connection flanges 1316, 1322 are substantially similar to like components of the first and second flame arresters 500, 900 of FIGS. 5-12. As such, the first connection flange 1316 of FIG. 13 extends radially outward from the first end 1326 of the first pipe section 1314.

In the illustrated example of FIG. 13, the first and second body flanges 1318, 1324 are slip-on flanges (or weld neck flanges) to eliminate the cost, time, and materials spent on manufacturing blind flanges. Thus, as shown in FIG. 13, the first body flange 1318 extends radially outward from a third pipe section 1334, and the second body flange 1324 extends radially outward from a fourth pipe section 1336. In the illustrated example, the first body flange 1318 and the third pipe section 1334 are constructed as a single unitary part or component (e.g., a monolithic structure). However, in other examples, the first body flange 1318 and the third pipe section 1334 are separate parts coupled together via mechanical and/or chemical connections (e.g., welding, threading, epoxy, etc.).

In the illustrated example of FIG. 13, an inner diameter 1338 of the third pipe section 1334 is the same as an inner diameter 1340 of the fourth pipe section 1336. In some examples, the inner diameter 1338 of the third pipe section 1334 is different than the inner diameter 1340 of the fourth pipe section 1336. In the illustrated example, the inner diameters 1338, 1340 of the third and fourth pipe sections 1334, 1336 are less than an inner diameter 1342 of the passageway 1307 of the body 1306. However, in other examples, the inner diameters 1338, 1340 of the third and fourth pipe sections 1334, 1336 are the same or substantially the same the inner diameter 1342 of the passageway 1307.

As shown in FIG. 13, the body 1306 of the flame arrester 1300 has a first end 1344 and a second end 1346 opposite the first end 1344. The inner diameter 1342 extends across the passageway 1307, and the passageway 1307 extends along a length 1348 of the body 1306 between the first and second ends 1344, 1346. In some examples, the inner diameter 1342 corresponds to an outer diameter of the plurality of flame cells 1308. In some examples, the inner diameter 1342 of the body 1306 is the same as the inner diameter 1338 of the third pipe section 1334. In some examples, the inner diameter 1342 of the body 1306 is greater than the inner diameter 1338 of the third pipe section 1334. In the illustrated example, the length 1348 of the body 1306 is longer than the fourth length 1204 of the body 906 because of the configurations of the first and second body flanges 1318, 1324.

The first end housing 1302 of the flame arrester 1300 of FIG. 13 includes a first end plate 1350 coupled to an inner surface 1351 of the third pipe section 1334 and the second end 1328 of the first pipe section 1314. The flame arrester 1300 also includes a second end plate 1352 coupled to an inner surface 1353 of the fourth pipe section 1336 and the fourth end 1332 of the second pipe section 1320. The first end plate 1350 is coupled to the first pipe section 1314 via a first weld joint 1354 and is coupled to the third pipe section 1334 via a second weld joint 1356. Additionally or alternatively, the first plate 1350 is coupled to the first and third pipe sections 1314, 1334 via other mechanical fasteners (e.g., threading, etc.) and/or chemical fasteners (e.g., epoxy, etc.). The first end plate 1350 may be a commercially available part or may be manufactured based on dimensions of the first pipe section 1314, the first body flange 1318, and/or the third pipe section 1334.

The first and second body flanges 1318, 1324 are used to couple (e.g., clamp) the body 1306 between the first and second end housings 1302, 1304. The first body flange 1318 includes first openings, and the second body flange 1324 includes second openings that are axially aligned with the first openings (similar to the openings 634, 636 disclosed above in connection with FIGS. 6 and 10). The first and second openings receive fasteners 1358 (only one of which is shown and labeled in FIG. 13) extending between the first and second body flanges 1318, 1324. The flame arrester 1300 includes the fasteners 1358 to clamp the body 1306 between the first and second body flanges 1318, 1324. The example fasteners 1358 may be implemented similarly to the fasteners 638 of the first flame arrester 500 and/or the fasteners 1038 of the second flame arrester 900. However, the fasteners 1358 are longer than the fasteners 638 and shorter than the fasteners 1038 based on the length 1348 of the body 1306.

The flame arrester 1300 of FIG. 13 includes a first crossbar 1360 and a second crossbar 1362 to support the plurality of flame cells 1308 and inhibit movement thereof in the axial direction. The first and second crossbars 1360, 1362 have a length 1364 that is smaller than the length 740 of the first and second crossbars 736, 738 of the first and second flame arresters 500, 900. In the illustrated example, first and second crossbars 1360, 1362 are coupled to an inner surface 1366 of the body 1306 on opposing sides of the plurality of flame cells 1308. In some examples, the crossbars 1360, 1362 are welded to the body 1306. Thus, the crossbars 1360, 1362 may have a thickness larger than the thickness 742 of FIGS. 7 and 11 to ensure enough material is provided for a sufficient joint, bond, and/or weld. In some examples, the first and second pipe sections 1314, 1320 extend into the body 1306 and contact the crossbars 1360, 1362. Thus, the first and second crossbars 1360, 1362 may not be coupled to the body 1306 and instead may be supported by the surrounding framework of the body 1306 and the pipe sections 1314, 1320.

In some examples, the overall size and weight of the first and second crossbars 1360, 1362 are reduced relative to the first and second crossbars 736, 738. Furthermore, the combined configurations of the first and second body flanges 1318, 1324 and the first and second end plates 1350, 1352 allow the first and second end housings 1302, 1304 to have a reduced weight relative to the first and second end housings 502, 504. Thus, the third flame arrester 1300 has an overall reduced weight relative to the first and second flame arresters 500, 900, which can provide some cost advantages due to material savings, fewer/lighter support structures, and/or fewer/lighter fasteners between the first and second connection flanges 1316, 1322 and connected pipes.

Figure 14:
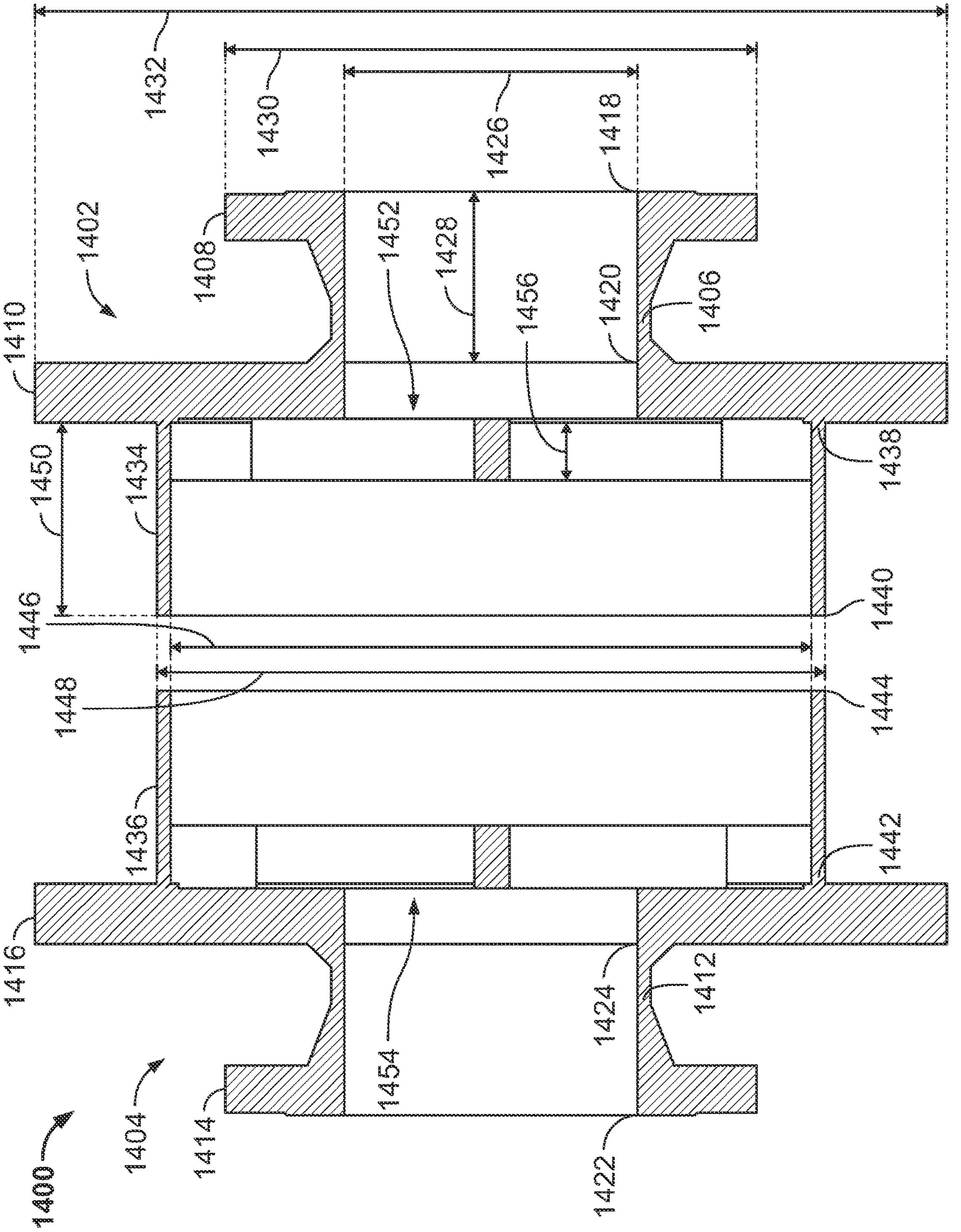
FIG. 14 is a cross-sectional side view of a first example pair of end housings constructed in accordance with teachings disclosed herein that may be included in the first, second, and/or third example flame arresters of FIGS. 5-13.

FIG. 14 illustrates a cross-sectional side view of a first example pair of end housings 1400 in accordance with teachings disclosed herein. The first pair of end housings 1400 can be implemented in the first, second, and/or third example flame arresters of FIGS. 5-13. The first pair of end housings 1400 includes a first end housing 1402 and a second end housing 1404 that is substantially similar to the first end housing 1402. As such, details of the first end housing 1402 disclosed herein are also applicable to the second end housing 1404.

In the illustrated example, the first end housing 1402 is constructed as a single, unitary part (e.g., a monolithic structure, etc.). In some examples, the first end housing 1402 is constructed via die casting. Additionally or alternatively, the first end housing 1402 is constructed via additive manufacturing, in which multiple metal layers are fused together. In some examples, the first end housing 1402 has a reduced manufacturing cost and increasing strength based on this single, unitary structure. For example, the first end housing 1402 can be die casted to have thicker walls, reinforcing ribs, and bigger fillets. In some examples, only a portion of the first end housing 1402 is a single part, and the remaining elements are assembled together with the single part to construct the first end housing 1402. As such, although various elements of the first end housing 1402 are described individually below, it should be appreciated that some or all of elements can be part of the same structure.

In the illustrated example of FIG. 14, the first end housing 1402 includes a first pipe section 1406, a first connection flange 1408, and a first body flange 1410. In some examples, one or more of the first pipe section 1406, the first connection flange 1408, and the first body flange 1410 are integrally formed (e.g., die casted, additively manufactured, etc.) to construct the first end housing 1402. In the illustrated example, the second end housing 1404 includes a second pipe section 1412, a second connection flange 1414, and a second body flange 1416.

In the illustrated example of FIG. 14, the first pipe section 1406 has a first end 1418 and a second end 1420 opposite the second end. Similarly, the second pipe section 1412 has a third end 1422 and a fourth end 1424 opposite the third end 1422. The first pipe section 1406 has a first inner diameter 1426 along a first length 1428 extending between the first and second ends 1418, 1420. The first connection flange 1408 extends radially from the first end 1418 of the first pipe section 1406 and has a first outer diameter 1430. The first body flange 1410 extends radially from the second end 1420 of the first pipe section 1406 and has a second outer diameter 1432. The second outer diameter 1432 is larger than the first outer diameter 1430. The second connection flange 1414 extends radially from a third end 1422 of the second pipe section 1412 and has the first outer diameter 1430. The second body flange 1416 extends radially from a fourth end 1424 of the second pipe section 1412 and has the second outer diameter 1432. The first and second body flanges 1410, 1416 include openings (e.g., openings 634) to receive fasteners (e.g., the fasteners 638, 1038, and/or 1322 of FIGS. 5-13, etc.) for coupling the first and second end housings 1402, 1404.

In the illustrated example, the first end housing 1402 includes a first body portion 1434 extending axially from the first body flange 1410 in a direction away from the first pipe section 1406. The second end housing 1404 includes a second body portion 1436 extending axially from the second body flange 1416 in a direction away from the second pipe section 1412. The first body portion 1434 includes a first end 1438 and a second end 1440 opposite the first end 1438. The first end 1438 of the first body portion 1434 is proximate and/or coupled (e.g., welded) to the first body flange 1410. Similarly, the second body portion 1436 includes a third end 1442 and a fourth end 1444 opposite the third end 1442. The third end 1442 of the second body portion 1436 is proximate and/or coupled to the second body flange 1416.

In the illustrated example of FIG. 14, the first and second body portions 1434, 1436 are cylinders configured as two halves of a body of an example flame arrester. Thus, the second end 1440 and the fourth end 1444 can be coupled (e.g., welded, clamped via the fasteners) together such that the connected first and second end housings 1402, 1404 form the flame arrester. The first body portion 1434 of FIG. 14 has a second inner diameter 1446 and a third outer diameter 1448 along a second length 1450 extending between the first and second ends 1438, 1440. The second inner diameter 1446 of the first body portion 1434 is larger than the first inner diameter 1426 of the first pipe section 1406. The third outer diameter 1448 is larger than the first outer diameter 1430. In the illustrated example of FIG. 14, the second outer diameter 1432 is larger than the third outer diameter 1448.

In some examples, the second inner diameter 1446 corresponds to a diameter of flame cell(s) to be disposed within the first and/or second body portions 1434, 1436. In some examples, the second and fourth ends 1440, 1444 include male or female components (e.g., circumferential moldings, ridges, indentations, etc.) to align, connect, and/or interlock the end housings 1402, 1404 together, prevent slippage, and/or to provide grooves within which sealants and/or adhesives (e.g., O-rings, gaskets, epoxies, welds, etc.) can be placed.

In some examples, the first body portion 1434 is composed of cantilevered beams extending from the first end 1438 to the second end 1440. As such, rather than forming the body, the first and second body portions 1434, 1436 may be a framework that are configured support a body (e.g., the body 506, the body 906, etc.) between the first and second end housings 1402, 1404. In some examples, the first and second body portions 1434, 1436 include a plurality of cantilevered beams (e.g., two, four, six, etc.) that interdigitate with or without physical contact.

In the illustrated example of FIG. 14, the first end housing 1402 includes a first crossbar 1452, and the second end housing 1404 includes a second crossbar 1454. The first crossbar 1452 is disposed in the third end 1438 of the first body portion 1434. In some examples, the first crossbar 1452 and the first end housing 1402 are constructed as a single part. The first crossbar 1452 extends radially across the second inner diameter 1446 of the first body portion 1434. The first crossbar 1452 extends axially from the first body flange 1410 along an axial length 1456. In some examples, the first crossbar 1452 is coupled to the first body flange 1410 and the first end 1438 of the first body portion 1434.

In some examples, the axial length 1456 of the first crossbar 1452 is based on the dimensions(s) of flame cell(s) to be disposed within an example flame arrester constructed from the first pair of end housings 1400. For example, the length 1456 of the first crossbar 1452 can be dimensioned such that sufficient support and space is provided to the flame cell(s) while also ensuring the second and fourth ends 1440, 1444 join properly. In some examples, the first crossbar 1452 is not integrated into the first end housing 1402 and/or not coupled to the first body flange 1410 or the body portion 1434. Thus, the first crossbar 1452 may be held in place based on support from surrounding framework of the first body portion 1434, the first body flange 1410, and the flame cell.

In some examples, the first end housing 1402 includes the flame cell integrated into the first body portion 1434. Thus, the flame cell may be constructed in the same manufacturing process (e.g., die molding, additive manufacturing, etc.) as the first end housing 1402 such that the flame cell and the first end housing 1402 are constructed as a single part. In some examples, a first flame cell is fully embedded within the first body portion 1434, and a second flame cell is fully embedded within the second body portion 1436. Thus, a side of the first flame cell may be substantially flush with the second end 1440, and a side of the second flame cell may be substantially flush with the fourth end 1444. In some examples, the flame cell is embedded within the first body portion 1434 and extends beyond the second end 1440. Thus, the flame cell may be inserted into the second body portion 1436 when the first pair of end housings 1400 are coupled together.

Figure 15:
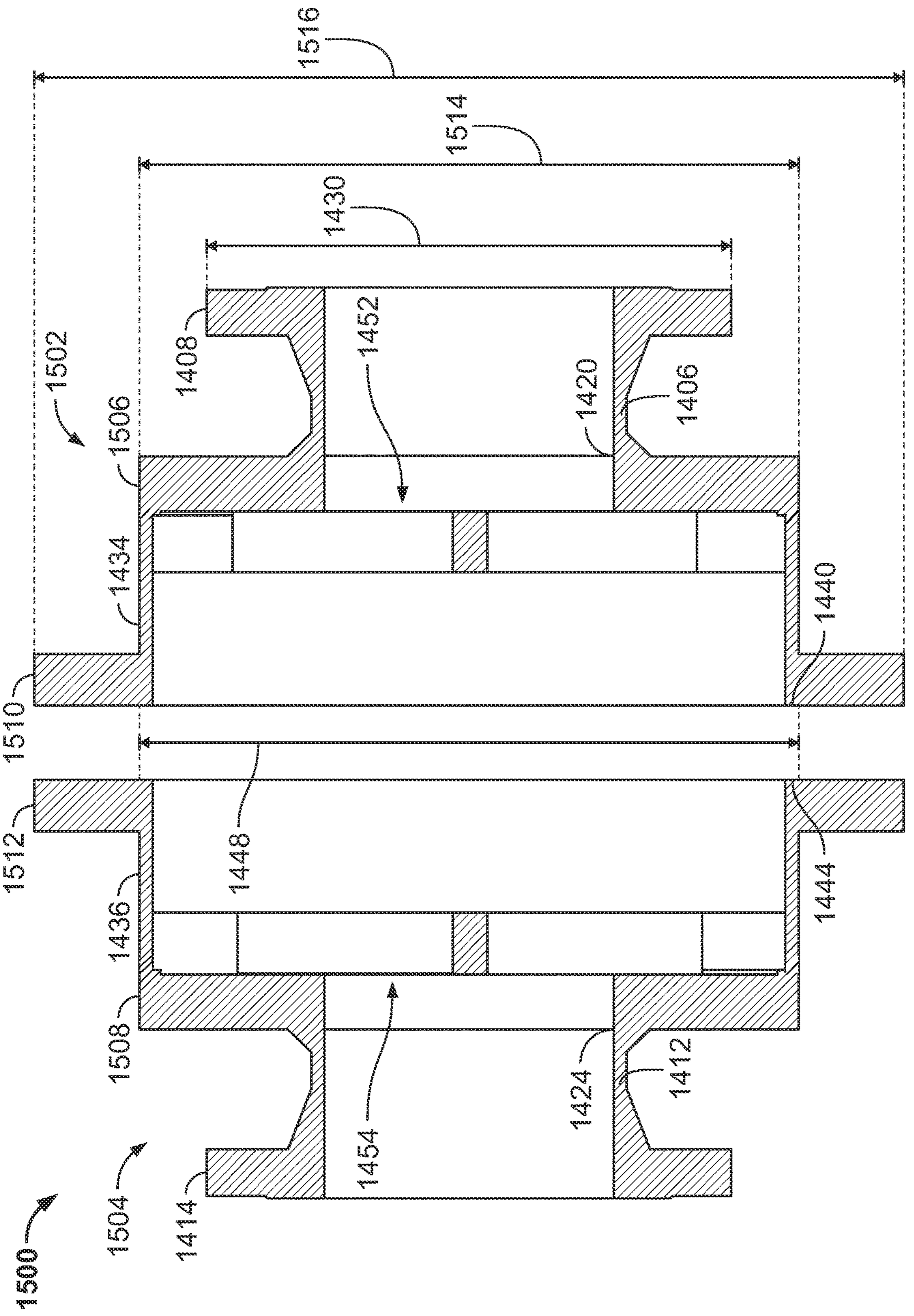
FIG. 15 is a cross-sectional side view of a second example pair of end housings constructed in accordance with teachings disclosed herein that may be included in the first, second, and/or third flame arresters of FIGS. 5-13.

FIG. 15 illustrates a cross-sectional side view of a second example pair of end housings 1500 in accordance with teachings disclosed herein. The second pair of end housings

1500 can be implemented in the first, second, and/or third example flame arresters of FIGS. 5-13. The second pair of end housings 1500 include a first end housing 1502 and a second end housing 1504 that is substantially similar to the first end housing 1502. As such, details of the first end housing 1502 disclosed herein are also applicable to the second end housing 1504.

The first pair of end housings 1500 of the illustrated example is similar to the first pair of end housings 1400 of FIG. 14. As such, the first end housing 1502 of the illustrated example includes the first pipe section 1406, the first connection flange 1408, and the first crossbar 1452 and the second end housing includes the second pipe section 1412, the second connection flange 1414, and the second crossbar 1454. Furthermore, the first end housing 1502 is constructed as a single, cohesive, and/or unitary part. Furthermore, the first end housing 1502 can be constructed from die casting and/or additive manufacturing. In some examples, only a portion of the first end housing 1502 is a single part, and the remaining elements are assembled together with the single part to construct the first end housing 1502. As such, although various elements of the first end housing 1502 are described individually below, it should be appreciated that some or all of elements can be integrated into the same structure.

The second pair of end housings 1500 includes a first distal body flange 1506, a second distal body flange 1508, a first proximal body flange 1510, and a second proximal body flange 1512. The first distal body flange 1506 extends radially from the second end 1420 of the first pipe section 1406 and has a fourth outer diameter 1514. The second distal body flange 1508 extends radially from the fourth end 1424 of the second pipe section 1412 and also has the fourth outer diameter 1514. In some examples, the fourth outer diameter 1514 is corresponds to and/or is substantially similar to the third outer diameter 1448 of the first body portion 1426.

In the illustrated example, the first proximal body flange 1510 extends radially from the second end 1440 of the first body portion 1434 and has a fifth outer diameter 1516. The second proximal body flange 1512 extends radially from the fourth end 1444 of the second body portion 1436 and also has the fifth outer diameter 1516. In the illustrated example, the fourth outer diameter 1514 of the first distal body flange 1506 is larger than the first outer diameter 1430 of the first connection flange 1408. In the illustrated example, the fifth outer diameter 1516 of the first proximal body flange 1510 is larger than the fourth outer diameter 1514 of the distal body flange 1506 and the third diameter 1448 of the first body portion 1434.

In the illustrated example, the first and second proximal body flanges 1510, 1512 include openings (e.g., openings 634) to receive fasteners (e.g., the fasteners 638, 1038, and/or 1322 of FIGS. 5-13, etc.). The fasteners pull the first and second end housings 1502, 1504 together such that the first and second proximal body flanges 1510, 1512 interface (e.g., with or without interposing component(s)) when the fasteners are tightened. Additionally or alternatively, the first and second proximal body flanges 1510, 1512 may be coupled via other mechanical and/or chemical fasteners, such as clamps, adhesives, coatings, etc. In some examples, the second pair of end housings 1500 includes sealants (e.g., O-rings, gaskets, etc.) positioned between the first and second proximal body flanges 1510, 1512. Some such sealants may be disposed within groove(s) and/or recess(es) in the first and/or second proximal body flanges 1510, 1512. In some examples, an additional body portion is interposed between the first and second proximal body flanges 1510, 1512 when the first and second end housings 1502, 1504 are coupled together.

Figure 16:
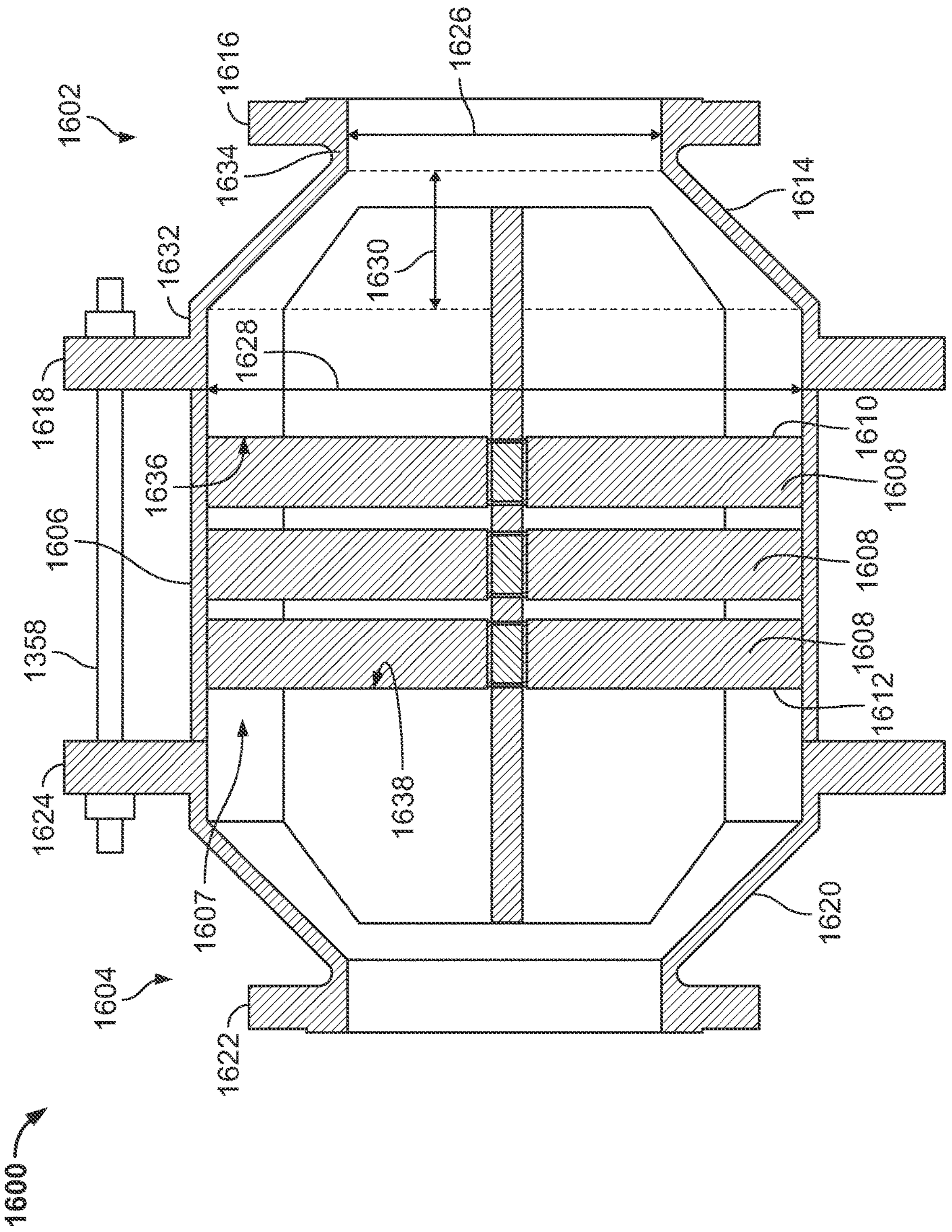
FIG. 16 is a cross-sectional side view of a fourth example flame arrester constructed in accordance with teachings disclosed herein.

FIG. 16 illustrates a fourth example flame arrester 1600 constructed in accordance with teachings disclosed herein. FIG. 16 is a cross-sectional side view of the fourth flame arrester 1600. The example flame arrester 1600 can be implemented as the flame arrester 102 shown in FIG. 1. Similar to the flame arresters 500, 900, and 1300, the fourth flame arrester 1600 can be implemented as an in-line detonation flame arrester and/or an in-line deflagration flame arrester.

In the illustrated example, the flame arrester 1600 includes a first end housing 1602, a second end housing 1604, and a body 1606 coupled (e.g., clamped) between the first and second end housings 1602, 1604. The body 1606 is cylindrical and defines an inner cavity or passageway 1607. In some examples, body 1606 of FIG. 16 is substantially similar to the body 1306 of FIG. 13. However, in some other examples, the body 1606 is different (e.g., axially shorter, radially smaller, etc.) than the body 1306. In some examples, the flame arrester 1600 is symmetrical such that the first end housing 1602 and the second end housing 1604 are identical, mirrored, and/or otherwise share a substantially similar design and/or configuration. It should then be appreciated that descriptions of the first end housing 1602 and the elements thereof can likewise apply to the second end housing 1604 and associated elements, and vice versa. However, in other examples, the first and second end housings 1602, 1604 are not identical, and the flame arrester 1600 is not symmetrical.

The flame arrester 1600 includes a plurality of flame cells 1608 having a first side 1610 and a second side 1612 opposite the first side 1610. In some examples, the plurality of flame cells 1608 are substantially similar to the plurality of flame cells 1104 of FIGS. 11 and 12 and/or the plurality of flame cells 1308 of FIG. 13. As mentioned above, the plurality of flame cells 1608 may be referred to as a flame cell assembly having a plurality of flame cells or flame cell elements. In some examples, the flame arrester 1600 includes another suitable number of flame cells (e.g., two, four, six, etc.) or a single flame cell (e.g., the flame cell 704, etc.).

In the illustrated example of FIG. 16, the flame arrester 1600 includes the first end housing 1602 having a first reducer section 1614, a first connection flange 1616, and a first body flange 1618. The flame arrester of FIG. 16 also includes the second end housing 1604 having a second reducer section 1620, a second connection flange 1622, and a second body flange 1624. In some examples, the first and second the end housings 1602, 1604 include the reducer sections 1614, 1620 to provide flow characteristics of gasses and/or flames to the flame arrester 1600 in a different manner than other example flame arresters including end housings having straight or constant pipe sections (e.g., the pipe sections 510, 1314, etc.) as disclosed herein. For example, the flame arrester 1600 may be implemented as a deflagration flame arrester, such that the second reducer section 1614 reduces the speed of a flame propagating at subsonic speeds into the second housing 1604 after an ignition on the unprotected side. As shown, the reducer section 1614 gradually expands or tapers radially outward from a first inner diameter 1626 to a second inner diameter 1628 and extends along a length 1630 between the first connection flange 1616 and the first body flange 1618. The first inner diameter 1626 corresponds to the first connection flange 1616, and the second inner diameter 1628 corresponds to the first body flange 1618.

The reducer section 1614 of the illustrated example of FIG. 16 is coupled to the connection flange 1616 and the body flange 1618. The connection flange 1616 and the body flange 1618 are slip on (or weld neck) flanges. As such, the connection flange includes a first protrusion 1632 (or a neck) extending in a first direction toward the body flange 1618, and the body flange 1618 includes a second protrusion 1634 (or neck) extending in a second direction toward the connection flange 1616, the second direction opposite the first direction. In some examples, the reducer section 1614 is coupled to the first and protrusions 1632, 1634 via mechanical fasteners (e.g., welding, etc.) and/or chemical fasteners (e.g., adhesives, etc.). In some other examples, the connection flange 1616 and/or the body flange 1618 are blind flanges having central openings having the first inner diameter 1626 and/or the second inner diameter 1628, respectively. In such examples, the reducer section 1614 may be directly coupled to the connection flange and/or the body flange instead of the first and/or second protrusions 1632, 1634.

The flame arrester 1600 includes a first crossbar 1636 disposed within the first end housing 1602 and a second crossbar 1638 disposed within the second end housing 1604. As illustrated, the first and second crossbars 1636, 1638 are substantially similar, mirrored, identical, or otherwise match based on the similarity between the first and second end housings 1402, 1404. In some examples, the first and second crossbars 1636, 1638 are different based on dissimilarities between the first and second end housings 1602, 1604. As opposed to other crossbars disclosed herein (e.g., first crossbar 736, second crossbar 738, etc.), which are completely disposed within the bodies of respective flame arresters, the first crossbar 1636 of FIG. 16 is partially disposed within the first end housing 1602 and the body 1606.

In some examples, the first crossbar 1636 is adapted to match the profile of the first reducer section 1614. For example, the first crossbar 1636 has an extended tapered (or wedged) profile with one or more gradually curved transitions to match the cross-sectional profile of the reducer sections. Given such a profile, the first reducer section 1614 can axially support the first crossbar 1636, which can in turn support the plurality of flame cells 1608. That is, the first and second reducer sections 1614, 1620 can clamp, hold, and/or restrict movement of the first and second crossbars 1636, 1638 within the flame arrester 1600 without the need for fasteners, such as welding. In the illustrated example, the first and second crossbars 1636, 1638 form internal chambers within the flame arrester 1600 as disclosed below.

Figure 17:
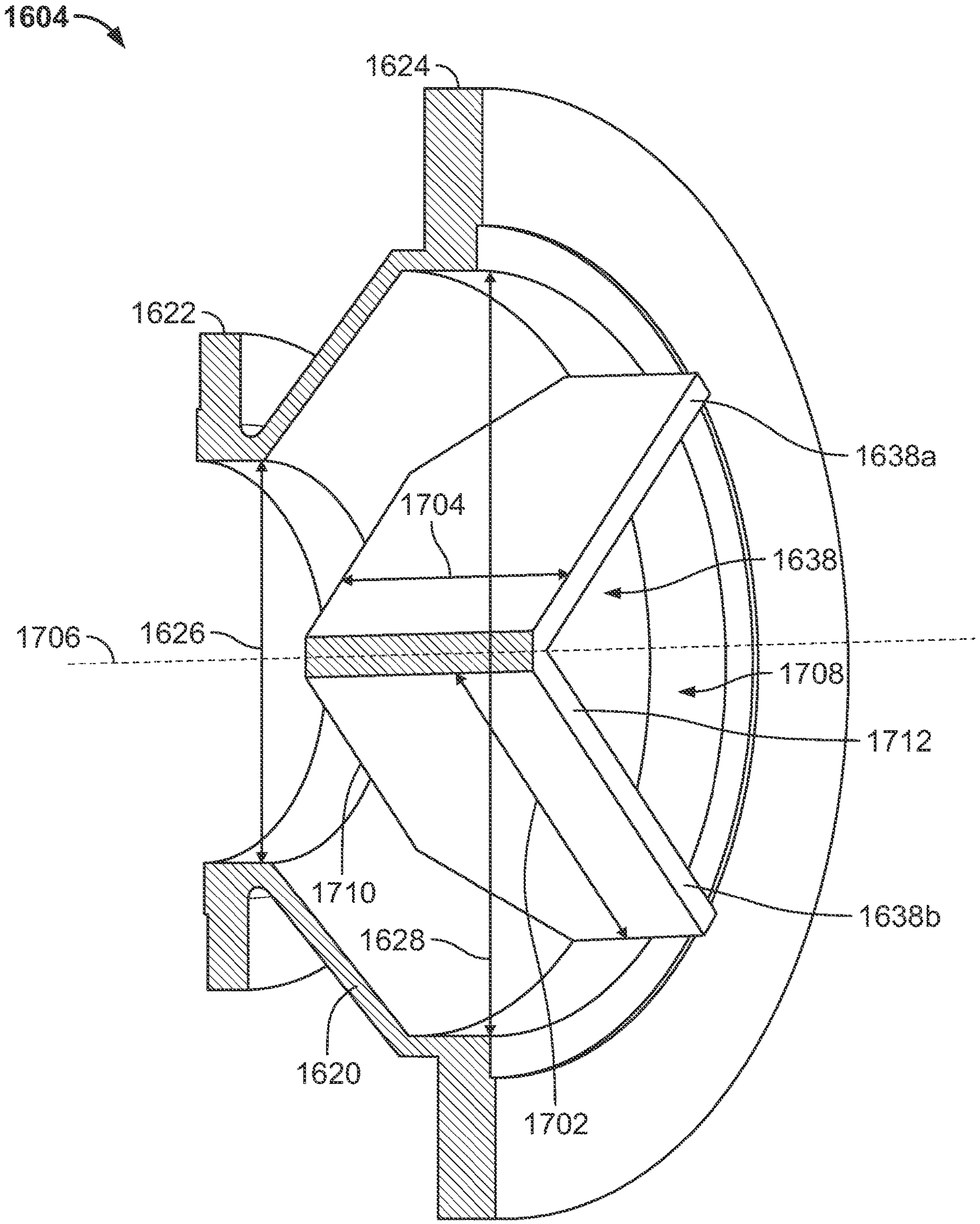
FIG. 17 is a cross-sectional side view of the second end housing of the fourth flame arrester of FIG. 16.

FIG. 17 illustrates the second end housing 1604 of the fourth flame arrester 1600 constructed in accordance with teachings disclosed herein. FIG. 17 is a magnified cross-sectional perspective view of the second end housing 1604. In the illustrated example, the second crossbar 1638 includes a first bar **1638*a* and a second bar 1638*b* that extend radially across an increasing internal diameter of the reducer section 1620 and the second internal diameter 1628 of the second body flange 1624. As such, the first and second bars 1638*a*, 1638*b* have a radial length 1702 that varies along an axial length 1704 of the second crossbar 1638**.

The first and second bars **1638*a*, 1638*b* intersect to form four bars (or spokes) extending radially outward from a central axis 1706 (or hub) of the second end housing. As such, the second crossbar creates four chambers (e.g., detonation chambers or deflagration chambers) in a portion of the end housing 1604 and the body 1606. In the illustrated example of FIG. 17, a first internal flame chamber 1708 is shown. The four internal chambers (including the first internal flame chamber 1708) have a substantially similar function as the internal flame chambers (including the first internal flame chamber 743) of FIGS. 7, 8, 11, 12, and 13**.

As illustrated in FIG. 17, the second crossbar 1638 extends along the axial length 1704 between a first end 1710 and a second end 1712 opposite the first end 1710. The axial length 1704 is dimensioned such that the second end 1712 of the crossbar 1638 extends beyond the second body flange 1624. Thus, when the flame arrester 1600 is fully assembled, a portion of the second crossbar 1638 is disposed within the body 1606. Furthermore, the second reducer section 1620 is able to support the second crossbar 1638 while the second end 1712 provides support to the plurality of flame cells 1608. In some examples, the second end 1712 contacts the second side 1612 of the plurality of flame cells 1608. However, in some other examples, a clearance is created between the second crossbar 1638 and the second side 1612. In some examples, the second end 1712 is aligned or flush with the second body flange 1624 and does not extend into the body 1606. In such examples, the body 1606 may be configured such that the first and second sides 1610, 1612 of the plurality of flame cells 1608 are also aligned with the body flanges 1618, 1624, and the crossbars 1636, 1638 are still able to contact, clamp, and/or support the plurality of flame cells 1608.

From the foregoing, it should be appreciated that example flame arresters disclosed herein include shorter or truncated end housings to form an axially shorter and lightweight flame arrester. Such example flame arresters in accordance with teachings disclosed herein are more customizable and are easier to integrate into legacy systems, such as piping systems, ventilation systems, fuel systems, etc. Using commercially available parts in example flame arresters disclosed herein further increases the customizability while reducing the costs associated with manufacturing, procurement, assembly, etc. Crossbars that support flame cells within example flame arresters can be lightweight while also providing enhanced structural support due to the configuration of the end housings. Such crossbars also form individual detonation or deflagration chambers that reduce the pressure forces acting on the flame cells caused from downstream ignitions. Since example flame arresters include straight pipe sections within the end housings, detonation shock waves can impact the crossbars and/or flame cell parallel to the flame cell, which can be favorable to reflective shock wave impacts associated with reducer end housings. Example end housings can also be die casted or additively manufactured into unitary parts to further reduce costs, improve strength, and/or reduce the axial length of example flame arresters.

The example features and techniques disclosed herein can be used to reduce the size and weight of in-line flame arresters or end-of-line flame arresters. In particular, one or more end housings disclosed herein can be used with in-line or end-of-line flame arresters in place of or in combination with conventional end housings typical used therewith. Furthermore, the example features and techniques disclosed herein are described as pertaining to flame arresters with circular cross-sections due the disk-shaped flame cells used therein. However, examples disclosed herein are also applicable to flame arresters and flame cells of alternative shapes or cross-sections, such as square, triangular, hexagonal, etc.

Example systems, apparatus, and articles of manufacture have been disclosed herein. Examples and example combinations disclosed herein include:

Example 1 includes a flame arrester comprising a first end housing including a first pipe section having a first end and a second end opposite the first end, the first pipe section having a first inner diameter along a first length between the first end and the second end, a first connection flange extending from the first pipe section at the first end, and a first body flange extending from the first pipe section at the second end, a second end housing including a second pipe section having a third end and a fourth end opposite the third end, the second pipe section having a second inner diameter along a second length between the third end and the fourth end, a second connection flange extending from the second pipe section at the third end, and a second body flange extending from the second pipe section at the fourth end, a body coupled between the first body flange and the second body flange, the body having a third inner diameter along a third length between the first and second body flanges, the third inner diameter larger than the first and second inner diameters, and a flame cell disposed in the body, the flame cell having a first side, a second side, and a plurality of channels between the first and second sides.

Example 2 includes the flame arrester of example 1, further including a first crossbar disposed between the first body flange and the first side of the flame cell, the first crossbar extending radially across a passageway of the body, the first crossbar extending axially between the first side of the flame cell and the first body flange.

Example 3 includes the flame arrester of example 2, further including a second crossbar disposed between the second body flange and the second side of the flame cell, the second crossbar extending radially across the passageway of the body, the second crossbar extending axially between the second side of the flame cell and the second body flange.

Example 4 includes the flame arrester of example 3, wherein the first crossbar is clamped between the first side of the flame cell and the first body flange, and wherein the second crossbar is clamped between the second side of the flame cell and the second body flange.

Example 5 includes the flame arrester of example 3 or 4, wherein the first crossbar defines first chambers between the first side of the flame cell and the first body flange, the second crossbar defines second chambers between the second side of the flame cell and the second body flange, and the first and second crossbars inhibit swirling of gases in a circumferential direction within the body based on the first and second chambers.

Example 6 includes the flame arrester of example 5, wherein the first crossbar is positioned downstream from the second crossbar, the first crossbar to divide a flame into the first chambers when the flame propagates from a downstream location toward the flame arrester and interacts with the first crossbar.

Example 7 includes the flame arrester of any of examples 1-6, wherein the first body flange is a blind flange having a first opening, the first opening having a fourth inner diameter, the fourth inner diameter corresponding to an outer diameter of the first pipe section.

Example 8 includes the flame arrester of example 7, wherein the second end of the first pipe section is coupled to the first body flange via a weld joint.

Example 9 includes the flame arrester of examples 7 or 8, wherein the second body flange is a blind flange having a second opening, the second opening having a fifth inner diameter, the fifth inner diameter corresponding to an outer diameter of the second pipe section.

Example 10 includes the flame arrester of example 9, wherein the fourth end of the second pipe section is coupled to the second body flange via a weld joint.

Example 11 includes the flame arrester of any of examples 1-10, wherein the first inner diameter is the same as the second inner diameter.

Example 12 includes the flame arrester of any of examples 1-10, wherein the first inner diameter is different than the second inner diameter.

Example 13 includes an end housing of a flame arrester, the end housing comprising a pipe section having a first end and a second end opposite the first end, the pipe section having a first inner diameter along a first length extending between the first and second ends, a first flange extending radially outward from the first end of the pipe section, the first flange having a first outer diameter, a second flange extending radially outward from the second end of the pipe section, the second flange have a second outer diameter larger than the first outer diameter, and a body portion extending axially from the second flange in a direction away from the pipe section, the body portion having a third end coupled to the second flange and a fourth end opposite the third end, the body portion having a second inner diameter and a third outer diameter along a second length extending between the third and fourth ends, the second inner diameter larger than the first inner diameter, the third outer diameter larger than the first outer diameter.

Example 14 includes the end housing of example 13, further including a crossbar disposed in the third end of the body portion, the crossbar extending radially across the second inner diameter, the crossbar extending axially from the second flange along a third length.

Example 15 includes the end housing of example 14, wherein the pipe section, the first flange, the second flange, the body portion, and the crossbar are constructed as a single unitary part.

Example 16 includes the end housing of example 15, wherein the single unitary part is constructed of multiple metal layers fused together.

Example 17 includes the end housing of any of examples 14-16, wherein the pipe section, the first flange, the second flange, and the body portion are constructed as a single unitary part, the crossbar coupled to the third end of the body portion and the second flange.

Example 18 includes the end housing of any of examples 13-17, wherein the second outer diameter is same as the third outer diameter, further including a third flange radially extending from the fourth end of the body portion.

Example 19 includes the end housing of example 18, wherein the third flange includes openings to receive fasteners.

Example 20 includes a flame arrester comprising a pair of end housings, each end housing of the pair of end housings including a connection flange having a first inner diameter and a first outer diameter, a body flange having a second inner diameter and a second outer diameter, and a pipe section extending along a first length between a first end and a second end opposite the first end, the first end coupled to the connection flange, the second end coupled to the body flange, the pipe section having the first inner diameter and a third outer diameter, the third outer diameter corresponding to the second inner diameter, the first inner diameter of the pipe section being constant along the first length, a body between the pair of end housings, the body having a third end and a fourth end opposite the third end, the body having a third inner diameter along a second length between the third and fourth ends, the third inner diameter being constant along the second length, and a disk-shaped flame cell disposed in the body, the disk-shaped flame cell having a first side, a second side, and a plurality of channels between the first and second sides.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A flame arrester comprising:

a first end housing including:

a first pipe section having a first end and a second end opposite the first end, the first pipe section having a first constant inner diameter extending entirely along a first length between the first end and the second end;

a first connection flange extending from the first pipe section at the first end; and a first body flange extending from the first pipe section at the second end;

a second end housing including:

a second pipe section having a third end and a fourth end opposite the third end, the second pipe section having a second constant inner diameter extending entirely along a second length between the third end and the fourth end;

a second connection flange extending from the second pipe section at the third end; and a second body flange extending from the second pipe section at the fourth end;

a body coupled between the first body flange and the second body flange, the body having a third inner diameter along a third length between the first and second body flanges, the third inner diameter larger than the first and second constant inner diameters;

a flame cell disposed in the body, the flame cell having a first side, a second side, and a plurality of channels between the first and second sides; and a crossbar disposed in the body, wherein the crossbar is clamped between and in contact with an inner surface side of the first body flange and the first side of the flame cell, and wherein the crossbar is in contact with an inner surface of the body such that the crossbar is axially and radially constrained in the body.

2. The flame arrester of claim 1, wherein the crossbar is a first crossbar, the first crossbar extending radially across a passageway of the body.

3. The flame arrester of claim 2, further including a second crossbar disposed between the second body flange and the second side of the flame cell, the second crossbar extending radially across the passageway of the body, the second crossbar extending axially between the second side of the flame cell and the second body flange.

4. The flame arrester of claim 3, wherein the second crossbar is clamped between the second side of the flame cell and the second body flange.

5. The flame arrester of claim 3, wherein the first crossbar defines first chambers between the first side of the flame cell and the first body flange, the second crossbar defines second chambers between the second side of the flame cell and the second body flange, and the first and second crossbars inhibit swirling of gases in a circumferential direction within the body based on the first and second chambers.

6. The flame arrester of claim 5, wherein the first crossbar is positioned downstream from the second crossbar, the first crossbar to divide a flame into the first chambers when the flame propagates from a downstream location toward the flame arrester and interacts with the first crossbar.

7. The flame arrester of claim 1, wherein the first body flange is a first disc having a first central opening, the first central opening having a fourth inner diameter, the fourth inner diameter corresponding to an outer diameter of the first pipe section.

8. The flame arrester of claim 7, wherein the second end of the first pipe section is coupled to the first body flange via a first weld joint.

9. The flame arrester of claim 8, wherein the second body flange is a second disc having a second central opening, the second central opening having a fifth inner diameter, the fifth inner diameter corresponding to an outer diameter of the second pipe section.

10. The flame arrester of claim 9, wherein the fourth end of the second pipe section is coupled to the second body flange via a second weld joint.

11. The flame arrester of claim 1, wherein the first constant inner diameter is the same as the second constant inner diameter.

12. The flame arrester of claim 1, wherein the flame cell is a first flame cell element, and further including a plurality of flame cell elements disposed in the body.

* * * * *